US012528117B2

United States Patent
Staudigel et al.

(10) Patent No.: US 12,528,117 B2
(45) Date of Patent: Jan. 20, 2026

(54) COMPOUND PARTICLES FOR USE IN A SHAPING AND SINTERING PROCESS AND PROCESS FOR PREPARING COMPOUND PARTICLES

(71) Applicant: HEADMADE MATERIALS GMBH, Unterpleichfeld (DE)

(72) Inventors: Christian Staudigel, Unterpleichfeld (DE); Christian Fischer, Unterpleichfeld (DE)

(73) Assignee: HEADMADE MATERIALS GMBH, Unterpleichfeld (DE)

( * ) Notice: Subject to any disclaimer, the term of this patent is extended or adjusted under 35 U.S.C. 154(b) by 0 days.

(21) Appl. No.: 18/997,175

(22) PCT Filed: Jul. 21, 2023

(86) PCT No.: PCT/EP2023/070329
§ 371 (c)(1),
(2) Date: Jan. 20, 2025

(87) PCT Pub. No.: WO2024/018072
PCT Pub. Date: Jan. 25, 2024

(65) Prior Publication Data
US 2025/0256328 A1 Aug. 14, 2025

(30) Foreign Application Priority Data
Jul. 21, 2022 (EP) .................................. 22186280

(51) Int. Cl.
B22F 1/10 (2022.01)
B22F 1/052 (2022.01)
(Continued)

(52) U.S. Cl.
CPC .............. *B22F 1/103* (2022.01); *B22F 1/052* (2022.01); *B22F 1/054* (2022.01); *B33Y 70/10* (2020.01);
(Continued)

(58) Field of Classification Search
None
See application file for complete search history.

(56) References Cited

U.S. PATENT DOCUMENTS

| 5,338,508 A * | 8/1994 | Nitta .................... C22C 33/0285 420/121 |
| 2015/0267097 A1* | 9/2015 | Rosenflanz .......... C09K 3/1409 451/28 |

(Continued)

FOREIGN PATENT DOCUMENTS

WO       2016195032 A1    12/2016

OTHER PUBLICATIONS

International Search Report for PCT Application No. PCT/EP2023/070329, mailed on Sep. 15, 2023.
(Continued)

*Primary Examiner* — George Wyszomierski
(74) *Attorney, Agent, or Firm* — Curatolo Sidoti & Trillis Co., LPA; Floyd Trillis, III; Salvatore A. Sidoti

(57) ABSTRACT

A plurality of compound particles for use in a shaping and sintering process, comprising pulverulent non-organic particles in a temporary organic binder, is characterized in that: (i) at least 80% of the pulverulent non-organic particles have a maximum dimension $A_{max}$ in the range of from 10 nm to 500 μm, (ii) the amount of the temporary organic binder ranges from about 1 to 99 vol.-%, based on the total volume of the compound particles, (iii) at least 80% of the compound particles have a maximum dimension $B_{max}$ in the range of from 10 μm to 1000 μm, (iv) the compound
(Continued)

particles have an apparent density of at least 70% of the true density, and (v) the compound particles have continuous external surfaces formed from pulverulent non-organic particles exposed at the external surfaces and temporary organic binder in the interstices between the pulverulent non-organic particles, the temporary organic binder presenting non-fractured surfaces. A process for preparing compound particles for use in a shaping and sintering process, comprises 1) providing a liquefied dispersion of pulverulent non-organic particles dispersed in a liquefied temporary organic binder, wherein at least 80% of the pulverulent non-organic particles have a maximum dimension $A_{max}$ in the range of from 10 nm to 500 µm, 2) atomizing the liquefied dispersion to obtain atomized droplets, at least 80% of the atomized droplets having a maximum dimension $B'_{max}$ in the range of from 10 µm to 1000 µm, and 3) allowing the atomized droplets to solidify to obtain the compound particles.

20 Claims, 6 Drawing Sheets

(51) Int. Cl.
*B22F 1/054* (2022.01)
*B22F 1/103* (2022.01)
*B33Y 70/10* (2020.01)
*C04B 35/632* (2006.01)

(52) U.S. Cl.
CPC ........ *C04B 35/632* (2013.01); *B22F 2999/00* (2013.01)

(56) References Cited

U.S. PATENT DOCUMENTS

| | | |
|---|---|---|
| 2016/0175929 A1 | 6/2016 | Colin et al. |
| 2018/0141118 A1* | 5/2018 | Machida ................ B22F 1/148 |
| 2018/0147627 A1 | 5/2018 | Nakamura et al. |
| 2018/0327557 A1 | 11/2018 | Jaeckel |
| 2019/0135708 A1 | 5/2019 | Jakob et al. |
| 2021/0395860 A1 | 12/2021 | Yamada et al. |
| 2024/0351099 A1* | 10/2024 | Staudigel ................ B22F 10/28 |
| 2025/0136814 A1* | 5/2025 | Staudigel ................ C04B 35/14 |

OTHER PUBLICATIONS

International Written Opinion for PCT Application No. PCT/EP2023/070329, mailed on Sep. 15, 2023.
International Preliminary Report on Patentability for PCT Application No. PCT/EP2023/070329, dated Oct. 2, 2024.

* cited by examiner

A  B

5

10

A  B

A  B  C

A                                                    B

COMPOUND PARTICLES FOR USE IN A SHAPING AND SINTERING PROCESS AND PROCESS FOR PREPARING COMPOUND PARTICLES

The present invention relates to compound particles comprising pulverulent non-organic particles in a temporary organic binder for use in a shaping and sintering process, and a process for preparing compound particles.

CROSS REFERENCE TO RELATED APPLICATIONS

This application is a national stage application of International Application No. PCT/EP2023/070329, filed 21 Jul. 2023, which claims priority from European Patent Application No. 22186280.8, filed 21 Jul. 2022, both of which applications are incorporated herein by reference.

Processes such as additive manufacturing, injection molding or pressing allow for the generation of customized parts in a quick and efficient way. Additive manufacturing involves material being added together such as powder grains being fused together, typically layer by layer. Generally, a typical additive manufacturing process comprises the steps of forming a first material-layer, and successively adding further material-layers thereafter, wherein each new material-layer is added on a pre-formed material-layer, until the entire three-dimensional structure (3D object) is materialized.

In Laser Beam Powder Bed Fusion (LB-PBF), powdered metal which is free of binder is sintered by the scanning of a high-power laser beam. To dispense with the necessity of high-power lasers, binder-coated metal powders have been shaped by additive manufacturing. In a post-processing step, the binder is removed and the metal powder sintered.

All of these novel processes require a feedstock compound comprising a sinterable material and a binder in a processible form, e.g. in the form of flowable particles.

US 2017/0021425 A1 describes a method for producing a substantially spherical metal powder. For this purpose, a particulate source metal is mixed with a binder in a solvent to form a slurry. The slurry is granulated, e.g. by spray-drying, to form substantially spherical granules, wherein each granule comprises an agglomeration of particulate source metal in the binder. The granules are debound at a debinding temperature to remove the binder from the granules forming debound granules. The debound granules are at least partially sintered at a sintering temperature such that particles within each granule fuse together to form partially or fully sintered solid granules.

US 2019/0270135 mentions a metallic build material granule including a plurality of primary metal particles and a temporary binder agglomerating the plurality of primary metal particles together for use in three-dimensional printing. Said particles are manufactured from a suspension of metallic substrate particles in a solvent in which a binder is dissolved which comprises a polymer soluble in the solvent. The method comprises the step of spray drying or freeze spraying with subsequent freeze-drying. The drying or sublimation step is carried out such that the solvent partially or completely transitions into the gas phase.

However, said spray drying or freeze-drying processes are rather energy-consuming and dissolution of the binder in a suitable solvent is required mandatorily. The use of huge amounts of both energy and solvents, which may be harmful or even toxic, is a major drawback of spray drying. The freeze-drying process allows for a uniform distribution of the sinterable material in the binder, while in spray-drying process, the shrinkage of the particle and migration of binder during drying leads to voids and/or shell-like structures. In both processes, the feedstock compound particles obtained are rather porous and brittle. Porosity and friability may, however, be disadvantageous in certain applications.

In the event of an additive manufacturing process, feedstock compound particles having a rounded shape, e.g. a spherical shape, are preferred over particles which, e.g., have sharp and/or convex corners or edges. This is due to the fact that upon successively adding material-layers on a pre-formed material-layer, the flowability of the feedstock compound particles is of great importance and compound particles having a rounded shape may be distributed more efficiently. However, particles having a rounded shape may not be obtained by comminution of a pre-formed bulk material.

In another case of an additive manufacturing process, feedstock compound particles having no or little porosity are preferred over particles which have a higher porosity. This is due to the fact that for building up dense parts, e.g. green parts, the compound particles should be as dense as possible and compound particles having a low porosity may be more suitable. However, particles having a low porosity may not be obtained by spray-drying or spray-freezing.

In another case of an additive manufacturing process, feedstock compound particles having a homogeneous distribution of sinterable material and binder throughout the particles are preferred over particles with an inhomogeneous distribution. This is due to the fact that for building up a green part with a homogeneous distribution, the compound particles should be as homogeneous as possible and compound particles having a homogeneous distribution may be more suitable. Sintering of green or brown parts with a homogeneous distribution of sinterable material and binder lead to a more uniform shrinkage and less distortion. However, particles having a homogeneous distribution of sinterable material and a binder may not be obtained by spray-drying.

It is therefore an object of the present invention to provide feedstock compound particles which avoid the disadvantages of spray-dried and freeze-dried particles and may be prepared by an energy- and resource-efficient process.

The invention relates to a plurality of compound particles for use in a shaping and sintering process, comprising pulverulent non-organic particles in a temporary organic binder, wherein:
(i) at least 80% of the pulverulent non-organic particles have a maximum dimension $A_{max}$ in the range of from 10 nm to 500 µm,
(ii) the amount of the temporary organic binder ranges from about 1 to 99 vol.-%, based on the total volume of the compound particles,
(iii) at least 80% of the compound particles have a maximum dimension $B_{max}$ in the range of from 10 µm to 1000 µm, and
(iv) the compound particles have an apparent density of at least 70% of the true density, and
(v) the compound particles have continuous external surfaces formed from pulverulent non-organic particles exposed at the external surfaces and temporary organic binder in the interstices between the pulverulent non-organic particles, the temporary organic binder presenting non-fractured surfaces.

The following description of preferred embodiments refers to both the compound particles and the process for preparing compound particles, unless noted otherwise.

The density of the compound particles according to the invention is reported as percentage of the apparent density relative to the true density. As an approximation, the true density can be assumed to be equal to the theoretical density. Theoretical density is the calculated average density by summation of each substance density multiplied with its mass faction. The material is treated as an ideal mixture, i.e. volume effects due to mixing such as volume contraction or crystallization effects are neglected. Also neglected are production-related effects, such as partial evaporation of some binder components.

According to the invention, the compound particles have an apparent density of at least 70% of true density. In an embodiment, the compound particles have an apparent density of at least 75%, preferably at least 80%, more preferably at least 85%, most preferably at least 90%, in particular at least 92%, in particular at least 93%, in particular at least 94%, in particular at least 95%, in particular at least 96%, in particular at least 97%, in particular at least 98%, in particular at least 99%, of the true density.

Apparent density is defined as the relationship between the mass and volume of the material, including closed intraparticle spaces but excluding open intraparticle spaces. The apparent density can be determined by a gas pycnometer without comminution of the particles.

Suitably, the apparent density of the compound particles may be determined by measuring the volume of a weighed amount of compound particles by means of pycnometry and dividing weight by volume. A manual pycnometer such as a specific gravity bottle or, preferably, an automated gas pycnometer device, in particular a helium pycnometer, may be used. Such automated gas pycnometer devices are suitably used for measuring the volume of solids, which may e.g. be regularly shaped, porous or non-porous, monolithic, powdered, granular or in some way comminuted, by employing the method of gas displacement and the volume-pressure relationship (Boyle's Law). The open pores are accessible from the outside of the compound particles, whereas the closed pores are not accessible from the outside of the compound particles, or in other words, are "hidden" from the gas used in the pycnometric determination. Apparent density is a measure of density that includes the volume of closed internal voids such as closed pores present in the compound particles.

True density is defined as the quotient of the mass over the volume of a material, without considering pores in the material. The true density can be calculated by the mass of a particle divided by its volume, wherein intraparticle spaces, i.e. open and closed pores, are excluded. The true density can be determined by subjecting particles to gas pycnometry after comminution of said particles such that the particles do not comprise closed pores. Alternatively, pores may be expelled from the material by completely melting the material and producing molded parts without intraparticle spaces, e.g. by injection molding, pressing or hot pressing. Subsequently, the density of the molded part is determined, e.g., by the Archimedes principle.

Preferably, the void space contained in closed pores accounts for 15% or less, preferably 10% or less, more preferably 8% or less, most preferably 6% or less, in particular 5% or less, in particular 4% or less, in particular 3% or less, in particular 2% or less, in particular 1% or less, of the total volume of the compound particle.

Suitably, the maximum pore size of the closed pores is 10 times or less, preferably 8 times or less, more preferably 6 times or less, most preferably 5 times or less, in particular 3 times or less, in particular 2 times or less, in particular 1 time or less, in particular 0.8 times or less, in particular 0.6 times or less, in particular 0.4 times or less, of the Dv(90) of the pulverulent non-organic particles.

In an embodiment, the maximum pore size of the closed pores is 30 µm or less, preferably 25 µm or less, more preferably 20 µm or less, most preferably 17 µm or less, in particular 15 µm or less, on particular 10 µm or less.

The pore size can be determined with micrography or computer tomography (CT), preferably by a Phoenix Nanotom® M CT device (available from GE Inspection Technologies, Wunstorf).

Generally, compound particles having an apparent density close to the true density result in green parts and/or sintered parts having low green porosity or low sinter porosity, respectively. "Green porosity" refers to the porosity of the green part, i.e. the void space prior to sintering. "Sinter porosity" refers to the porosity of the sintered part, i.e. the void space remaining after sintering. Low porosity compound particles are preferred due to the following reasons:

Porous compound particles tend to break or release primary particles during processing; in other words, dense particles are more stable with regard to mechanical stress.

Further, by using compound particles of high density, less air is enclosed inside the particles. Thus, the resulting green parts also contain less air which would have to escape from the green part, e.g. during laser sintering. Only then, green parts of high density, i.e. of low green porosity, are obtained. In other words, if air is present in the green part and is not removed completely, pores remain in the green part (and in the sintered part).

In an embodiment, the compound particles essentially do not have a microporous, mesoporous or macroporous structure, e.g. no interconnected intra-particle porosity or only have a small degree of interconnected porosity, as evidenced by gas sorption measurements, since the compound particles have a small specific surface. In the context of the present application, the term "interconnected porosity" of a particle refers to the presence of pores in said particle, wherein the pores are connected via paths, which preferably are of minimum and uniform width and spacing. Thus, the compound particles of said embodiment do not have pores which are connected via paths.

In an embodiment, the compound particles exhibit a ratio of the BET surface area to the projected surface area of 20 or less, preferably 15 or less, more preferably 10 or less, most preferably 5 or less.

The BET surface area (in $m^2/g$) may suitably be determined by gas sorption measurement, e.g. using nitrogen or krypton sorption measurement, preferably krypton sorption measurement. The projected particle surface area can be determined by a photometric method according to ISO 13322-2 using a Camsizer X2 device (available from Retsch). This method digitally records and measures the geometry (volume) and surface area of a large number of particles. This method determines the outwardly projected surface area of the particles in the analyzed surface without recording any increase owing to roughness or pores. From said volume and surface area, the specific surface area by volume (in $m^{-1}$) is calculated as the ratio of the surface area to the volume of said large number of particles. The projected particle surface area (in $m^2/g$) is obtained by dividing the specific surface area by volume by the particle density.

The compound particles have a high intra-particle homogeneity, meaning the non-organic particles are homogeneously distributed within the compound particle, nearly no voids are within the compound particle and there is no segregation of small non-organic particles or temporary binder. Non-even distribution of non-organic particles within the compound particles results in spots of accumulated binder (meaning coherent volume elements free of dispersed non-organic particles) having a dimension many times larger than the average distance between non-organic particles when evenly distributed.

Suitably, the maximum dimension of binder accumulation is 10 times or less, preferably 8 times or less, more preferably 6 times or less, most preferably 5 times or less, in particular 3 times or less, in particular 2 times or less, in particular 1 time or less, in particular 0.8 times or less, in particular 0.6 times or less, in particular 0.4 times or less, of the Dv(90) of the pulverulent non-organic particles.

In an embodiment, the maximum dimension of binder accumulation is 30 μm or less, preferably 25 μm or less, more preferably 20 μm or less, most preferably 17 μm or less, in particular 15 μm or less, on particular 10 μm or less.

The pore size and intra-particle homogeneity can be determined with micrography or computer tomography, preferably by a Phoenix Nanotom® M CT device (available from GE Inspection Technologies, Wunstorf).

According to the invention, the compound particles have continuous external surfaces formed from pulverulent non-organic particles exposed at the external surfaces and temporary organic binder in the interstices between the pulverulent non-organic particles. Put otherwise, the compound particles of the invention have essentially smooth surfaces with exposed pulverulent non-organic particles which are joined with the temporary organic binder. Not withstanding the above, the exposed surfaces of the non-organic particles might be coated with a thin film of the temporary organic binder due to the production process. Quite importantly, the temporary organic binder presents non-fractured surfaces. Generally, such fractured surfaces may occur upon mechanical comminution of a bulk material having the pulverulent non-organic particles dispersed in a matrix of the temporary organic binder.

The compound particles of the invention can be described as pellets of pulverulent non-organic particles held together by the temporary organic binder. The compound particles can manifest themselves in different states: a state where the voids in the pellet are partially filled with temporary organic binder which forms bridges between adjacent non-organic particles; a state where the temporary organic binder has coalesced into a continuous network interspersed with pockets of air; a state where the temporary organic binder fills all the void spaces in the pellet and forms menisci at the pellet surface; a state where the temporary organic binder level exceeds that required for filling all the void spaces.

In view of the desired properties of the compound particles, it is generally preferred that the temporary organic binder essentially completely fills the void spaces between non-organic particles in the compound particle and forms menisci at the external compound particles surfaces. In a cross-sectional view, the surface of the temporary organic binder in the voids is concave, e.g. in the form of a section of an ellipsoid perimeter.

Such compound particles may, e.g., be obtained by generating droplets of a liquefied, e.g. molten, solution or dispersion followed by solidification. However, particles which are obtained by any means of comminution, e.g. by crushing; milling such as ball milling, rod milling, cryomilling etc.; cutting; vibrating etc., comprise arbitrary shapes with corners and edges and may therefore be defined as particles exhibiting fractured surfaces.

Further in this connection, the surfaces of the compound particles of the invention essentially have no recessed parts on their external surfaces. Such recessed parts may originate during mechanical comminution, e.g. milling, when a pulverulent non-organic particle is broken out of the surface of a newly formed compound particle, leaving behind a gap or recessed part on the surface. In microphotographs, compound particles with recessed parts on their surface may exhibit a sponge-like structure, e.g. a structure with fractured and/or angular surfaces.

In an embodiment, the compound particles essentially have a non-angular shape. The term "non-angular" (shaped particle) denotes a particle having no sharp corners, e.g. substantially smooth or rounded shapes, no convex edges which are formed by surfaces intersecting at an acute angle. Preferably, the radius of curvature of remaining apices is at least 20% of the particle diameter.

In an embodiment, the compound particles have a spherical shape, a drop-shape, a potato-shape, a sausage-shape, a fibrous shape, a whisker-shape, or combinations thereof.

As used herein, the term "spherical shape" denotes that the shape of an object resembles that of a perfect sphere to the greatest possible extent.

As used herein, the term "drop-shape" denotes a shape having a perimeter (the path that surrounds the drop shape area) that may be described as consisting of one vertex and one curved line, wherein the vertex is formed at the point wherein the ends of the curved line meet.

As used herein, the term "potato-shape" denotes a shape which has a similar shape as a potato. Typically, a potato-shaped object may be elongated, elliptical, oval or the like, wherein the object does not have to be of a uniform or symmetrical shape.

As used herein, the term "sausage-shape" denotes, in the context of particles, a particle having a ratio between average length and average breadth in a range of 1.5 to 20, and an angle-lacking and non-sphere, so to speak, Vienna sausage-like shape.

As used herein, the term "whisker-shape" or "fibrous shape" denote "hair-like" or filament-like shapes which may be straight or slightly bent, preferably without having kinked parts.

Suitably, the non-angular particles may have a high value of sphericity. "Sphericity" is a measure of how closely the shape of an object, e.g. a particle, resembles that of a perfect sphere. Sphericity is defined as the ratio of surface area of a sphere that has the same volume as the particle or object to the surface area of the particle itself. Average sphericity can be measured, for example, using the Camsizer® image analysis system (Retsch Technology GmbH; Haan; Germany). The average sphericity is the volume average sphericity. Preferably, the compound particles of the present application have a sphericity value of at least 0.6, preferably at least 0.65, more preferably at least 0.7, most preferably at least 0.74, in particular at least 0.78, in particular at least 0.8, in particular at least 0.83, in particular at least 0.86, in particular at least 0.88, in particular at least 0.90.

According to the invention, at least 80% of the compound particles have a maximum dimension $B_{max}$ in the range of from 10 μm to 1000 μm. In an embodiment, at least 85%, preferably at least 90%, more preferably at least 95%, most preferably at least 99% of the compound particles have a maximum dimension $B_{max}$ in the range of from 5 μm to 700 μm, preferably 10 μm to 500 μm, more preferably 15 μm to 300 μm, most preferably 30 μm to 200 μm.

Pulverulent Non-Organic Particles

The term "pulverulent non-organic particles" is intended to denote any non-organic particle that is sinterable and preferably has desirable properties in a shaping and sintering process. In particular, pulverulent non-organic particles include conventionally known sinterable materials. In general, the pulverulent non-organic particles are selected from metals, alloys, vitreous particles and ceramic particles.

According to the invention, at least 80% of the pulverulent non-organic particles have a maximum dimension $A_{max}$ in the range of from 10 nm to 500 μm. In an embodiment, at least 85%, preferably at least 90%, more preferably at least 95%, most preferably at least 99% of the pulverulent non-organic particles have a maximum dimension $A_{max}$ in the range of from 100 nm to 400 μm, preferably 500 nm to 250 μm, more preferably 1 μm to 150 μm, most preferably 5 μm to 100 μm.

The maximum dimension $A_{max}$ is the length of a particle in the direction of its longest elongation. Alternatively, the size distribution of the non-organic particles may be characterized by the Dv(90) value. The Dv(90) (by volume) corresponds to the $90^{th}$ percentile of the particle size distribution, meaning that 90% of the particles have a size of the Dv(90) or smaller and 10% have a size larger than the Dv(90). Generally, the Dv(90) is less than 500 μm, more preferably less than 400 μm, most preferably less than 250 μm, in particular less than 150 μm, in particular less than 100 μm, in particular less than 50 μm.

In an embodiment, metals are selected from iron, stainless steel, steel, copper, bronze, aluminum, tungsten, molybdenum, silver, gold, platinum, titanium, nickel, cobalt, chromium, zinc, niobium, tantalum, yttrium, silicon, magnesium, calcium and combinations thereof.

Suitably, alloys are selected from steels such as stainless steels (316 L, 17-4 PH), chromium-nickel steels, bronzes, copper alloys such as Hovadur, nickel-base alloys such as Hastelloy or Inconel, cobalt and cobalt-chromium alloys such as stellite, aluminum alloys such as Aluminum 6061, tungsten heavy alloys, titanium alloys such as grade 1 via grade 5 (Ti-6Al-4V) to grade 38 according to ASTM.

In an embodiment, ceramic particles are selected from oxides such as aluminum oxides, silicon oxides, zirconium oxides, titanium oxides, magnesium oxides, yttrium oxides; carbides such as silicon carbides, tungsten carbides; nitrides such as boron nitrides, silicon nitrides, aluminum nitrides; silicates such as steatite, cordierite, mullite; and combinations thereof.

In an embodiment, vitreous particles are selected from non-oxide glasses such as halogenide glasses, chalcogenide glasses; oxide glasses such as phosphate glasses, borate glasses, silicate glasses such as aluminosilicate glasses, lead silicate glasses, boron silicate glasses, soda lime silicate glasses, quartz glasses, alkaline silicate glasses; and combinations thereof.

Suitably, the pulverulent non-organic particles may contain combinations of more than one of metals, alloys, vitreous particles and ceramic particles as described above, for example hard metals or metal matrix composites (also referred to as metal ceramic composites).

In an embodiment, the compound particles contain the pulverulent non-organic particles in an amount of about 0.70 to 0.99·$\varphi_r$ or by volume, preferably about 0.75 to 0.98·$\varphi_r$ or by volume, more preferably about 0.80 to 0.96·$\varphi_r$ or by volume, most preferably about 0.82 to 0.95·$\varphi_r$ or by volume, in particular about 0.84 to 0.94·$\varphi_r$ r by volume, in particular about 0.86 to 0.93·$\varphi_r$ by volume, wherein $\varphi_r$ is the critical solids loading by volume. The remainder is comprised of binder component b).

Generally, the term "critical solids loading" is referred to as the amount of pulverulent non-organic particles by volume in a feedstock compound at a critical limit. Said "critical limit" is reached when the feedstock compound becomes stiff and does not flow due to the relative viscosity becoming infinite upon addition of pulverulent non-organic particles to the feedstock compound. Physically, "critical solids loading" defines the maximum packing arrangement of particles while still retaining a continuous material and it is the limit above which it is not possible to continue loading the binder matrix with solid powders. In this context, the term "relative viscosity" denotes the viscosity of the feedstock compound in relation to the viscosity of the neat binder in order to isolate the effect of the pulverulent non-organic particles. The viscosity of the feedstock compound increases upon addition of pulverulent non-organic particles.

There are several ways to determine the critical solids loading. For example, one can determine the peak in the torque of a kneader when more and more metal powder is added to the binder. After critical solids loading is reached, the torque usually decreases again as the feedstock compound becomes more friable. Alternatively, a pycnometer measurement may be used: up to the critical solids loading, the theoretical density is in agreement with the measured density at the pycnometer, above the critical solids loading, the measured density is below the theoretical density due to pores (see also: 1990, R. M. German, Powder Injection Molding, Metal Powder Industries Federation 1990, p. 129-130). Rheological measurements may also be used to estimate the value of the critical solids loading by plotting $\varphi \cdot \eta_r$: ($\eta_r-1$) versus $\varphi$ (J. S. Chong, E. B. Christiansen, A. D. Baer, J. Appl. Polym. Sci. 1971, 15, 2007-2021). In this context, ¢ denotes the loading, $\eta_r$ denotes the relative viscosity.

Alternatively, in an embodiment, the compound particle contains the pulverulent non-organic particles in an amount of about 1 to 99% by volume, preferably 10 to 90% by volume, more preferably 20 to 80% by volume, most preferably 30 to 75% by volume, in particular 40 to 70% by volume, and the binder component (b) in an amount of about 1 to 99% by volume, preferably 10 to 90% by volume, more preferably 20 to 80% by volume, most preferably 25 to 70% by volume, in particular 30 to 60% by volume.

Temporary Organic Binder

The compound particles comprise a temporary organic binder. For most downstream applications, this binder has only a temporary task, namely for making the compound particles susceptible to additive manufacturing processes using comparatively low-power lasers and for adhesion of the non-organic particles as long as the green part has not been sintered yet. The temporary binder disappears during sintering.

According to the invention, the amount of the temporary organic binder is in the range of from about 1 to 99 vol.-%, based on the total volume of the compound particles. In an embodiment, the amount of the temporary organic binder is in the range of from about 10 to 90 vol.-%, preferably 20 to 80 vol.-%, more preferably 25 to 70 vol.-%, most preferably 30 to 60 vol.-%.

The binder may be selected from thermoplastic or wax-type materials or combinations thereof. The thermoplastic and/or wax-type material may be selected from a variety of materials.

Suitable Polymers Include:
vinyl ester polymers such as ethylene vinyl acetate copolymers such as Escorene® UltraUL 8705 (available from Exxon Mobile), ELVAX® 250 (available from Dow) VISCOWAX® 334, VISCOWAX® 453 (available from Innospec Leuna); polyolefins such as polyethylene such as Lupolen 2420, Lupolen 5261 Z (available from LyondellBasell Industries Holdings B.V.), Sabic P6006NA (available from Sabic), BorPure® MB5569, BorPure® MB6561, BorPure® MB7541 (available from Borealis), Exceed® 1018, Enable® 2203MC (available from Exxon Mobile), polypropylene such as BC250MO, BC545MO (available from Borealis), Adstif HA5029, Adstif HA600U, Adstif EA600P, Adstif EA648P, Clyrell RC213M, Clyrell RC5056, Hostalen PP H5416 (available from LyondellBasell Industries Holdings B.V.), Achieve® Advanced U.S. Plant Pat. No. 6,936G2, Achieve® Advanced U.S. Plant Pat. No. 6,945G1, Achieve® Advanced U.S. Plant Pat. No. 6,035G1, ExxonMobil® U.S. Plant Pat. No. 1,105E1, ExxonMobil® U.S. Plant Pat. No. 3,155E5, ExxonMobil® U.S. Plant Pat. No. 9,574E6 (available from Exxon Mobile), propylene-ethylene copolymers such as Vistamaxx 8880 (available from Exxon Mobile), modified polyolefins such as grafted polypropylene Licocene® PP MA 1332 (available from Clariant); acrylates such as polymethylmethacrylate (PMMA), ethylene n-butyl acrylate copolymer such as EnBA EN 33091 (available from Exxon Mobile); polyamides such as, polyamide 12, copolyamide such as Griltex 2439 A, Griltex 1796 A, Griltex 1500 A, Griltex D 2638A (available from EMS-CHEMIE HOLDING AG); Orgasol 3502 D (available from Arkema), UNI-REZ 2620, UNI-REZ 2638, UNI-REZ 2656, UNI-REZ 2674, UNI-REZ 2720, UNI-REZ 2291 (available at Kraton Corporation); polycarbonate, poly-α-methylstyrene, polyurethanes; water-soluble or water-dispersible thermoplastic polymers such as polyalkylene glycols, polyvinyl alcohols, polyvinyl lactams, polyvinylpyrrolidons, and copolymers thereof; and mixtures thereof.

The term "wax" is a collective technological term for a group of organic substances that can generally be described in terms of their physical and technical properties. In particular, waxes are characterized by the fact that they are solids with a melting point above 40° C. (usually between 50° C. and 160° C.), a low melt viscosity (below 10 Pa·s at 10° C. above the melting point). Waxes melt without decomposing. Waxes can be also divided in natural waxes of fossil origin such as paraffin, montan wax; natural waxes of natural origin such as beeswax, carnauba wax; semi-synthetic waxes (also referred to as chemically modified natural waxes) such as ethylene-bis-stearamide; synthetic waxes such as polyolefin waxes. In the context of this patent application, the expression "wax-type materials" is intended to include waxes as well as wax-type substances such as ester-type waxes, higher alcohols, higher fatty acids showing wax-like properties.

Suitable Wax-Type Materials Include:
paraffin waxes such as microcrystalline wax; ester-type waxes such as beeswax, candelilla wax, carnauba wax, esters of carboxylic acids, preferably of fatty acids having 10 to 34 carbon atoms or esters of a hydroxybenzoic acid; amide waxes such as amides of fatty acids having 10 to 25 carbon atoms such as oleamide such as Deurex A 27 P (available from Deurex AG), erucamide such as Deurex A 26 P (available from Deurex AG), ethylene-bis-stearamide such as Deurex A 20 K (available from Deurex AG);
polyolefin-waxes such as polyethylene-wax such as Deurex E 06 K, Deurex E 08, Deurex E 09 K, Deurex E 10 K (available from Deurex AG), VISCOWAX® 111, VISCOWAX® 116, VISCOWAX® 123, VISCOWAX® 135 (available from Innospec Leuna); oxidized polyethylene wax such as Deurex EO 40 K, Deurex EO 42, Deurex EO 44 P, Deurex E 76 K (available from Deurex AG), VISCOWAX® 252, VISCOWAX® 262, VISCOWAX® 271, VISCOWAX® 2628 (available from Innospec Leuna), polypropylene-wax such as Deurex P 36 K, Deurex P 37 K (available from Deurex AG), oxidized polypropylene wax; Fischer-Tropsch wax such as VESTOWAX EH 100, VESTOWAX H 2050 MG, VESTOWAX SH 105, Shell GTL Sarawax SX 105, Shell GTL Sarawax SX 80 (available from Evonik Industries AG); polyethylene glycol; and mixtures thereof.

Preferably, the binder comprises a first thermoplastic and/or wax-type material (b-i) and the second thermoplastic and/or wax-type material (b-ii) which differ in at least one property which property is selected from solubility in a solvent, degradability induced by heat and/or a reactant, and volatility. In the event that the binder component ingredients (b-i) and (b-ii) differ in their solubility in a solvent and the first thermoplastic and/or wax-type material (b-i) is less soluble than the second thermoplastic and/or wax-type material (b-ii), debinding is carried out as a solvent debinding step using a suitable solvent. In other words, during solvent debinding, at least a part of the second thermoplastic and/or wax-type material (b-ii) is dissolved in a suitable solvent, whereas the majority of the first thermoplastic and/or wax-type material (b-i) remains within the green part. Hence, as the first thermoplastic and/or wax-type material (b-i) provides the necessary shape retention of the debound part, the first thermoplastic and/or wax-type material (b-i) is hereinafter also called "backbone polymer".

The binder component may comprise 3 to 70% by volume, preferably 5 to 60% by volume, more preferably 7 to 50% by volume, most preferably 10 to 40% by volume, in particular 12 to 35% by volume, in particular 15 to 30% by volume, of the first thermoplastic and/or wax-type material (b-i), based on the total volume of the binder component.

The binder component may further comprise 30 to 97% by volume, preferably 40 to 95% by volume, more preferably 50 to 93% by volume, most preferably 60 to 90% by volume, in particular 65 to 88% by volume, in particular 70 to 85% by volume, of a second thermoplastic and/or wax-type material (b-ii), based on the total volume of the binder component.

Different solubility or degradability or different volatility allows for selective debinding. In the selective debinding step, one binder component is removed (in the context of the present patent application: the second thermoplastic and/or wax-type material (b-ii)) wherein at the same time another binder component (the first thermoplastic and/or wax-type material (b-i)) remains within the part to be manufactured, holding together the sinterable non-organic particles. Such debinding processes, e.g. solvent debinding, thermal debinding, chemical debinding etc., are known per se.

Suitably, in the solvent debinding process, one binder component may be selectively removed from a green part by means of dissolving said binder component in a solvent, wherein a second binder component remains within the green part. Therefore, the binder components need to differ in e.g. molecular weight or polarity in order to exhibit different solubilities in the solvent.

Any given polymer or wax may be fairly soluble in one solvent, e.g., a non-polar solvent, and may be poorly soluble or insoluble in another solvent, e.g., a more polar solvent. Hence, whether a given polymer or wax qualifies as a (b-i)

or (b-ii) material depends on the solvent intended for the debinding step. When changing solvents, e.g. from polar solvents to less polar or non-polar solvents or vice versa, the categorization of the binder components into (b-i) or (b-ii) may be reversed.

Preferably, the first thermoplastic and/or wax-type material (b-i) is a backbone polymer selected from polyolefins, polyolefinic waxes, polyamides, poly(meth)acrylates, polyesters, polyethers, and mixtures thereof. Suitable polyolefins include polyethylenes, polypropylenes, polyolefinic copolymers with different monomers, polyolefinic copolymers with non-olefinic monomers (such as ethylene vinyl acetate or ethylene n-butyl acrylate copolymer), modified polyolefins, polyolefinic waxes, and mixtures thereof. Representatives of suitable polymer that are commercially available are those mentioned above.

In an embodiment, the backbone polymers comprise a DSC melt peak temperature $T_P$ below 160° C., preferably below 150° C., more preferably below 140° C., most preferably below 130° C., in particular below 120° C., in particular below 110° C., in particular below 100° C., in particular below 90° C.

Preferably, the backbone polymers comprise a melt viscosity below 1500 Pa·s, preferably below 1300 Pa·s, more preferably below 1000 Pa·s, most preferably below 800 Pa·s, in particular below 600 Pa·s, in particular below 500 Pa·s, in particular below 400 Pa·s, in particular below 300 Pa·s, in particular below 200 Pa·s, in particular below 100 Pa·s, according to ISO 1133 with 2.16 kg at 160° C.

Preferably, the backbone polymers comprise a melt viscosity below 1500 Pa·s, preferably below 1300 Pa·s, more preferably below 1000 Pa·s, most preferably below 800 Pa·s, in particular below 600 Pa·s, in particular below 500 Pa·s, in particular below 400 Pa·s, in particular below 300 Pa·s, in particular below 200 Pa·s, in particular below 100 Pa·s, according to ISO 1133 with 2.16 kg at 190° C.

Preferably, the backbone polymers comprise a melt volume-flow rate of at least 5 cm$^3$/10 min, preferably at least 10 cm$^3$/10 min, more preferably at least 20 cm$^3$/10 min, most preferably at least 30 cm$^3$/10 min, in particular at least 40 cm$^3$/10 min, in particular at least 50 cm$^3$/10 min, in particular at least 60 cm$^3$/10 min, in particular at least 70 cm$^3$/10 min, in particular at least 80 cm$^3$/10 min, in particular at least 90 cm$^3$/10 min, in particular at least 100 cm$^3$/10 min, in particular at least 110 cm$^3$/10 min, in particular at least 120 cm$^3$/10 min, in particular at least 130 cm$^3$/10 min, in particular at least 140 cm$^3$/10 min, in particular at least 150 cm$^3$/10 min, in particular at least 160 cm$^3$/10 min, in particular at least 170 cm$^3$/10 min, in particular at least 180 cm$^3$/10 min, in particular at least 190 cm$^3$/10 min, in particular at least 200 cm$^3$/10 min, according to ISO 1133 with 2.16 kg at 160° C.

Preferably, the backbone polymers comprise a melt volume-flow rate of at least 5 cm$^3$/10 min, preferably at least 10 cm$^3$/10 min, more preferably at least 20 cm$^3$/10 min, most preferably at least 30 cm$^3$/10 min, in particular at least 40 cm$^3$/10 min, in particular at least 50 cm$^3$/10 min, in particular at least 60 cm$^3$/10 min, in particular at least 70 cm$^3$/10 min, in particular at least 80 cm$^3$/10 min, in particular at least 90 cm$^3$/10 min, in particular at least 100 cm$^3$/10 min, in particular at least 110 cm$^3$/10 min, in particular at least 120 cm$^3$/10 min, in particular at least 130 cm$^3$/10 min, in particular at least 140 cm$^3$/10 min, in particular at least 150 cm$^3$/10 min, in particular at least 160 cm$^3$/10 min, in particular at least 170 cm$^3$/10 min, in particular at least 180 cm$^3$/10 min, in particular at least 190 cm$^3$/10 min, in particular at least 200 cm$^3$/10 min, according to ISO 1133 with 2.16 kg and 190° C.

In an embodiment, the first thermoplastic and/or wax-type material (b-i) is a polyethylene wax and the second thermoplastic and/or wax-type material (b-ii) is an amide wax. The combination of a polyethylene wax and an amide wax lends itself to solvent debinding using ethanol or acetone as a solvent.

In a preferred embodiment, the first thermoplastic and/or wax-type material (b-i) is a polyamide and the second thermoplastic and/or wax-type material (b-ii) is a wax, preferably an ester-type wax. The combination of a polyamide and a wax lends itself to solvent debinding using acetone as a solvent.

In a preferred embodiment, the first thermoplastic and/or wax-type material (b-i) is a polypropylene wax and the second thermoplastic and/or wax-type material (b-ii) is an amide wax. The combination of a polypropylene wax and an amide wax lends itself to solvent debinding using ethanol as a solvent.

In a preferred embodiment, the first thermoplastic and/or wax-type material (b-i) is a polyethylene wax and the second thermoplastic and/or wax-type material (b-ii) is a water soluble or water-dispersible thermoplastic polymer such as polyethylene glycol. The combination of a polyethylene wax and a water soluble or water-dispersible thermoplastic polymer lends itself to solvent debinding using water or an aqueous solution as a solvent.

The following table illustrates combinations of (b-i), (b-ii) and solvents that have proven useful in implementing the invention; various further combinations are possible and the table shall not be limiting:

| first thermoplastic and/or wax-type material (b-i) | second thermoplastic and/or wax-type material (b-ii) | solvent |
|---|---|---|
| polyamide such as copolyamide (such as Griltex 2439 A) | ester-type waxes such as esters of a hydroxybenzoic acid (such as Loxiol 2472), optionally in combination with stearic acid | acetone |
|  | sulfonamide such as N-ethyltoluene-4-sulfonamide | acetone |
|  | amide wax such as oleamide (such as Deurex A27P) optionally in combination with stearic acid | acetone |
| polyethylene wax (such as Deurex E06) optionally with propylene-ethylene copolymer (such as Vistamaxx 8880) | amide wax such as oleamide (such as Deurex A27P) optionally in combination with stearic acid | ethanol or acetone |
| polyethylene wax (such as Deurex E06) | stearic acid | ethanol or acetone |
|  | higher alcohols such as 1-octadecanol | ethanol or acetone |
|  | esters of organic acids such as monostearin (glycerol 2-stearate) | ethanol or acetone |
| polypropylene wax (such as Deurex P37) | amide wax such as stearamide (such as Deurex A28P) optionally in combination with stearic acid | ethanol |
| polyethylene wax (such as Deurex E06) | polyalkylene glycol such as polyethylene glycol (such as polyethylene glycol 8000) | water or aqueous solution |
| poly(meth)acrylate such as polymethylmethacrylate (PMMA) (such as Technovit 9100) | ester-type waxes such as esters of a hydroxybenzoic acid (such as Loxiol 2472), optionally in combination | isopropanol |

13
-continued

| | | |
|---|---|---|
| | with stearic acid sulfonamide such as N-ethyltoluene-4-sulfonamide optionally in combination with stearic acid | isopropanol |
| polyolefinic copolymer (such as Jowat 256.10) | amide wax such as oleamide (such as Deurex A27P) optionally in combination with polyolefinic copolymers with non-olefinic monomers such as propylene-ethylene-maleic anhydride copolymer (such as Licocene 1332 TP) | ethanol or acetone |
| polyolefinic copolymers with non-olefinic monomers such as ethylene vinyl acetate copolymer (such as Jowat 280.10) | ester-type waxes such as esters of a hydroxybenzoic acid (such as Loxiol 2472), optionally in combination with stearic acid optionally in combination with polyolefinic copolymers with non-olefinic monomers such as propylene-ethylene-maleic anhydride copolymer (such as Licocene 1332 TP) | ethanol or acetone |
| | amide wax such as oleamide (such as Deurex A27P) optionally in combination with polyolefinic copolymers with non-olefinic monomers such as propylene-ethylene-maleic anhydride copolymer (such as Licocene 1332 TP) | ethanol or acetone |
| copolymeric wax of polyolefins such as ethylene vinyl acetate (such as VISCOWAX 353) | stearic acid | ethanol or acetone |
| | amide wax such as oleamide (such as Deurex A27P) | ethanol or acetone |
| | higher alcohols such as 1-octadecanol | ethanol or acetone |
| | esters of organic acids such as monostearin (glycerol 2-stearate) | ethanol |
| polyolefinic copolymers with non-olefinic monomers such as ethylene-n-butyl acrylate copolymer (such as EnBA EN 33901) | amide wax such as oleamide (such as Deurex A27P) optionally in combination with polyolefinic copolymers with non-olefinic monomers such as propylene-ethylene-maleic anhydride copolymer (such as Licocene 1332 TP) | ethanol or acetone |
| | esters of organic acids such as monostearin (glycerol 2-stearate) | ethanol |
| polyester such as polycaprolactone | ester-type waxes such as esters of a hydroxybenzoic acid (such as Loxiol 2472), optionally in combination with stearic acid | ethanol |
| | esters of organic acids such as monostearin (glycerol 2-stearate) | ethanol |
| | sulfonamide such as N-ethyltoluene-4-sulfonamide optionally in combination with stearic acid | ethanol |
| | amide wax such as oleamide (such as Deurex A27P) optionally in combination with polyolefinic copolymers with non-olefinic monomers such as propylene-ethylene-maleic anhydride copolymer (such as Licocene 1332 TP) | ethanol |
| | higher alcohols such as 1-octadecanol | ethanol |
| | polyester such as diphenyl phthalate optionally in combination with stearic acid | ethanol |
| polyester-based thermoplastic elastomer (such as Riteflex 425) | esters of organic acids such as monostearin (glycerol 2-stearate) | ethanol or acetone |

The first thermoplastic and/or wax-type material (b-i) and the second thermoplastic and/or wax-type material (b-ii), respectively, may be comprised of a single material or of a mixture of materials which meet the requirements of a difference in at least one property as defined above.

The binder component (b) may comprise a dispersant. One material constituting, for example, the second thermoplastic and/or wax-type material (b-ii) may act as a dispersant. Otherwise, an extraneous dispersant may additionally be incorporated.

Generally, the dispersant acts as an adhesion promotor and/or compatibilizer between the binder components (b-i) and/or (b-ii); and/or between the non-organic particles (a) and the binder component (b).

Suitably, the dispersant is selected from fatty acids having 10 to 24 carbon atoms such as capric acid, lauric acid, myristic acid, palmitic acid, stearic acid, arachidic acid, behenic acid, lignoceric acid, or oleic acid, preferably stearic acid.

Suitably, the extraneous dispersant is selected from metal salts of fatty acids. Generally, the metal may be selected from alkali metals, alkaline earth metals or transition metals such as lithium, sodium, potassium, magnesium, calcium, strontium, barium, and zinc. Suitably, the fatty acid may be selected from the fatty acids having 5 to 34 carbon atoms, preferably 10 to 28 carbon atoms as described above. Preferred metal salts of fatty acids are selected from sodium stearate, magnesium stearate, zinc stearate or magnesium oleate.

Due to the viscosity of the binder component (b) in the abovementioned ranges, the latter becomes, in the molten state, uniformly and homogeneously distributed between the sinterable non-organic particles (a) and joins the individual sinterable non-organic particles (a) or the individual particulate feedstock compounds.

In order to adjust the viscosity of the binder component (b), it may be desirable to incorporate a thinning agent or thickening agent. The thickening agent serves to increase the viscosity of the binder component when molten. This enhanced viscosity prevents the sag of the sinterable non-organic particles and facilitates uniform flow of the particles and imparts resistance to segregation and sedimentation.

The viscosity of the binder component (b), in particular, is adjusted, i.e. reduced or increased, by means of the thickening or thinning agent. Thinning agents are employed to lower the viscosity of the overall binder component. Thickening agents are employed to increase the viscosity of the overall binder component. The thinning agent can act as a plasticizer to allow control of the rheological properties and the fluidity of the first thermoplastic and/or wax-type material (b-i) or the second thermoplastic and/or wax-type material (b-ii).

Suitably, the thickening or thinning agent is selected from waxes and/or thermoplastic polymers such as polyolefins and polyolefin waxes, polyamides and amide waxes, paraffin waxes, ester-type waxes; vinyl esters such as ethylene vinyl acetate; abietates; adipates; alkyl sulfonates; amines and amides such as formamide, hydroxylalkylformamide, amine, diamine; azelates; benzoates; citrates; chlorinated paraffins; ether-ester plasticizers; glutarates; hydrocarbon oils; isobutyrates; maleates; oleates; phosphates; phthalates;

sulfonamides; oily liquids such as peanut oil, fish oil, castor oil; and mixtures thereof. Suitably, polyethylene wax Deurex E 09 K having a viscosity of <40 mPa·s at 140° C. can be used as a thinning agent, while Deurex E 25 having a viscosity of 4000 mPa·s at 140° C. or even higher molecular weight polyolefinic compounds can be used as thickening agent.

In an embodiment, the thickening or thinning agent and/or dispersant may be present in an amount of 0 to 15% by volume, preferably 0.01 to 10% by volume, more preferably 0.02 to 8% by volume, most preferably 0.5 to 6% by volume, based on the total volume of the binder component (b).

In an embodiment, the binder component (b) exhibits a viscosity, as determined at a temperature of 130° C.; and at a shear rate of 1 s$^{-1}$, of below 6 Pa·s, preferably below 5 Pas, more preferably below 4 Pa·s, most preferably below 3 Pa·s, in particular below 2 Pa·s, in particular below 1 Pa·s, in particular below 700 mPa·s, in particular below 400 mPa·s, in particular below 200 mPa·s. The determination of the viscosity is carried out in accordance with EN ISO 3219: 1994.

In an embodiment, the binder component (b) exhibits a viscosity, as determined at a temperature of 110° C.; and at a shear rate of 1 s$^{-1}$, of below 10 Pa·, preferably below 8 Pa·s, preferably below 6 Pa·s, more preferably below 5 Pa·s, most preferably below 4 Pas, in particular below 3 Pa·s, in particular below 2 Pa·s, in particular below 1 Pa·s, in particular below 600 mPa·s, in particular below 300 mPa·s. The determination of the viscosity is carried out in accordance with EN ISO 3219:1994.

In an embodiment, the binder component (b) exhibits a viscosity, as determined at a temperature of 100° C.; and at a shear rate of 1 s$^{-1}$, of below 10 Pa·s, preferably below 8 Pas, more preferably below 6 Pa·s, most preferably below 5 Pa·s, in particular below 4 Pa·s, in particular below 3 Pa·s, in particular below 2 Pa·s, in particular below 1 Pa·s, in particular below 500 mPa·s. The determination of the viscosity is carried out in accordance with EN ISO 3219:1994.

Process

The invention further relates to a process for preparing compound particles for use in a shaping and sintering process. The process comprises the steps of
1) providing a liquefied dispersion of pulverulent non-organic particles dispersed in a molten temporary organic binder, wherein at least 80% of the pulverulent non-organic particles have a maximum dimension $A_{max}$ in the range of from 10 nm to 500 µm,
2) atomizing the liquefied dispersion to obtain atomized droplets, at least 80% of the atomized droplets having a maximum dimension $B'_{max}$ in the range of from 10 µm to 1000 µm, and
3) allowing the atomized droplets to solidify to obtain the compound particles.

In general, the dispersion of pulverulent non-organic particles dispersed in a liquefied temporary organic binder as described above may be provided in a pre-mixed form (dispersion) or in a pre-mixed and pre-heated form (liquefied dispersion). The dispersion may be provided in a melting vessel which may optionally be heated and/or pressurized. In another embodiment, the dispersion may be liquefied by an extruder.

In an embodiment, the liquefied dispersion is provided by mixing and liquefying the pulverulent non-organic particles and the temporary organic binder in a heated melting vessel which may optionally be pressurized, preferably immediately before atomization. For this purpose, the pulverulent non-organic particles and the temporary organic binder may, e.g., be placed in the heated melting vessel in pulverulent form, as solid pellets or irregular chunks.

Suitably, the heated melting vessel may contain a circulation device such as a conventional motorized stir bar with at least two blades for homogenizing the pulverulent non-organic particles and the temporary organic binder obtaining the dispersion.

Suitably, the heated melting vessel may be heated, e.g. by at least one heating device for heating the dispersion above its melting temperature obtaining the liquefied dispersion. The at least one heating device may, e.g., be installed on the outer surface of the heated melting vessel. Suitably, the temperature is controlled by a temperature control device which is connected to one or more thermocouples which are installed in the heated melting vessel in a way that the temperature of the liquefied dispersion may be determined. The temperature control device may further control the heating rate of the (liquefied) dispersion.

As described above, the heated melting vessel may contain a circulation device such as a conventional motorized stir bar with at least two blades. After obtaining the liquefied dispersion, said circulation device may be used for maintaining the liquefied dispersion in a homogenized form by stirring and/or for pumping the liquefied dispersion towards the bottom of the heated melting vessel.

Optionally, the liquefied dispersion may be heated to a temperature which is above the melting temperature in the event that a higher temperature of the liquefied dispersion is beneficial for atomization. In general, the temperature is selected in such a way that it is above the melting temperature and below the degradation temperature of the liquefied dispersion so as to avoid degradation of the liquefied dispersion.

In general, the liquefied dispersion may be provided in an ambient air atmosphere. The liquefied dispersion may optionally be provided in an inert gas atmosphere such as nitrogen, argon, helium, carbon dioxide etc. Doing so may avoid thermal degradation of the liquefied dispersion at elevated temperatures. Another advantage is that the degradation temperature may be increased as compared to the degradation temperature of the same material when heated in an ambient air atmosphere where oxygen may react with the liquefied dispersion.

Suitably, for transporting the liquefied dispersion away from the heated melting vessel or the extruder, the flow path for the liquefied dispersion may be heated, such as a heated hose, in order to maintain the liquefied dispersion in a molten state.

Providing the liquefied dispersion does not involve the use of an extraneous solvent. As a consequence, steps (2) and (3) do not involve removal of an extraneous solvent. In step (3), the solidification of the atomized droplets to obtain the compound particles is due to the transition of the temporary organic binder from a molten state into the solid state. Hence, the process is distinguished from conventional spray drying where atomization is accompanied by evaporation of an extraneous solvent and where solidification occurs as a result of said removal of the solvent from the atomized droplets.

Suitably, for providing the liquefied dispersion, i.e. transporting the liquefied dispersion away from the heated melting vessel, a valve at the base of the heated melting vessel may be opened to allow for the liquefied dispersion to flow gravimetrically.

Alternatively, the liquefied dispersion is provided by pressurizing using a positive gas pressure of, e.g., nitrogen, argon, helium, air etc., on the liquefied dispersion.

Alternatively, the liquefied dispersion is provided by pumping using a suitable pump, e.g. a peristaltic pump or a progressing cavity pumps or an extruder.

In an embodiment, the liquefied dispersion is provided by passing through an at least partially heated extruder, by passing through a heated hose, or combinations thereof.

In particular, the heated melting vessel and/or the pump may be an at least partially heated extruder.

Generally, when using an at least partially heated extruder, the pulverulent non-organic particles and the temporary organic binder may enter the extruder, e.g., in pulverulent form, as solid pellets or irregular chunks and may then be homogeneously mixed obtaining the dispersion. Alternatively, the dispersion may enter the at least partially heated extruder in a pre-mixed form. Suitably, said dispersion is then heated to a temperature above the melting temperature of the dispersion obtaining the liquefied dispersion. Alternatively, the pulverulent non-organic particles and the temporary organic binder may enter the extruder in a liquefied form, e.g. as a blend wherein the temporary organic binder is in a molten state. By means of the extruder, the so obtained liquefied dispersion may then be provided, i.e. transported away from the heated melting vessel by extruding.

Suitably, the at least partially heated extruder may be a single or twin screw extruder. The extruder may be mounted atop the atomizer.

In the present context, the expression "transporting the liquefied dispersion away from the heated melting vessel" is meant that the liquefied dispersion is transported to a part of the plant where atomization of the liquefied dispersion may be performed, i.e. to the atomizer.

The term "atomization" denotes that the liquefied dispersion is disintegrated to form (fine) atomized droplets. In an embodiment, the liquefied dispersion is atomized using a pressure atomizer, a rotary atomizer, or ultrasonication. Pressure atomizers include pressure nozzles, two fluid nozzles, or three fluid nozzles.

Suitably, a two-fluid nozzle atomizes a liquid or liquefied mixture, e.g. the liquefied dispersion, using a (spray) gas such as air, nitrogen, steam, etc. to obtain atomized droplets of the liquefied dispersion in form of a spray. Thus, for atomizing the liquefied dispersion using a two-fluid nozzle, the energy of a high velocity spray gas is exploited by contacting said high velocity spray gas and the liquefied dispersion. For example, internal mix two-fluid nozzles contact fluids inside the nozzle. Shearing between the high velocity spray gas and the low velocity fluid disintegrates the fluid into droplets, producing a high velocity spray. External mix two-fluid nozzles contact fluids outside the nozzle. This type of spray nozzle requires more atomizing air and a higher atomizing air pressure drop because the mixing and atomization of the fluid takes place outside the nozzle. If the fluid to be atomized contains solids, an external mix two-fluid nozzle may be preferred. Generally, for obtaining spherical particles, high energy disintegration of the liquefied dispersion is effected by using high spray gas pressures in the range of from 1 to 5 bara, preferably 2 to 4 bara.

Generally, for obtaining spherical particles, high energy disintegration of the liquefied dispersion is effected by using high air-to-liquid ratio. The loading ratio μ describes the ratio of the gas to the liquid phase (or ALR=air-to-liquid ratio, or GLR=gas-to-liquid-ratio). This is defined as the ratio of gas mass flow $M_G$ to liquid mass flow $M_L$ and is calculated according to the following equation: $\mu=ALR=M_G/M_L$.

Lower atomizing gas pressures and/or lower air-to-liquid ratios may be used for obtaining particles having non-spherical shapes such as a drop-shape, a potato-shape, a sausage-shape, a whisker-shape, a fibrous shape, or combinations thereof.

Suitably, a pressure nozzle may be used for atomizing the liquefied dispersion to obtain atomized droplets of the liquefied dispersion in form of a spray. Generally, a pressure nozzle comprises a stationary core which induces a rotary fluid motion resulting in swirling of a fluid in the swirl chamber. A film is discharged from the perimeter of the outlet orifice producing a characteristic hollow cone spray pattern. Air or another gas surrounding the pressure nozzle is drawn inside the swirl chamber to form an air core within the swirling liquid.

A rotary atomizer uses a high speed rotating disk, cup or wheel to discharge a liquid at high speed to the perimeter, forming a hollow cone spray. The particle size of the resulting atomized droplets may be controlled by the rotational speed of the rotary disk. Liquid is fed to the center of the rotating disk, cup or wheel and rotation results in migration of the liquid to the periphery and discharge as a spray of droplets. The atomizer may have a serrated perimeter so that the liquid is discharged at a series of points of small dimensions, and it may have radial grooves to feed the liquid to these points. Since rotary atomizers are capable of giving more uniform size droplets, their use may be preferred over pressure atomizers.

Suitably, ultrasonication may be used for atomizing or to support atomizing the liquefied dispersion to obtain atomized droplets of the liquefied dispersion in form of a spray. Generally, an ultrasonic nozzle is a spray nozzle which uses high frequency vibration (20 to 180 KHz) produced by piezoelectric transducers acting upon the nozzle tip resulting in the creation of capillary waves in a liquid film.

Once the amplitude of the capillary waves reaches a critical height due to the power level supplied by the generator, they become too tall to support themselves and tiny droplets fall off the tip of each wave resulting in atomization and the formation of a low velocity spray.

In a preferred embodiment, the liquefied dispersion is atomized by contacting the liquefied dispersion and a spray gas, which is optionally heated, in a two fluid nozzle.

Preferably, all parts of the plant which are contacted with the liquefied dispersion before atomization, e.g. vessels, extruders, hoses, atomizer etc., are heated to a temperature at which the liquefied dispersion remains in a liquid state so as to avoid solidification of the liquefied dispersion.

Suitably, at least 80% of the atomized droplets have a maximum dimension $B'_{max}$ in the range of from 10 μm to 1000 μm. Preferably, at least 85%, more preferably at least 90%, most preferably at least 95%, in particular at least 99% of the atomized droplets have a maximum dimension $B'_{max}$ in the range of from 5 μm to 700 μm, preferably 10 μm to 500 μm, more preferably 15 μm to 300 μm, most preferably 30 μm to 200 μm.

Preferably, the compound particles have a narrow particle size distribution. The particle size distribution is measured according to DIN ISO 13322-2, e.g. using a Camsizer X2 device (available from Retsch Technology GmbH; Haan; Germany).

After the liquefied dispersion leaves the atomizer in the form of atomized droplets, said atomized droplets enter and pass a fall chamber for solidification obtaining the compound particles. Suitably, the outlet of the atomizer is located above the inlet of the fall chamber so that the atomized droplets enter the fall chamber at its top part and pass through the fall chamber in a vertical direction from the top part to the bottom part. Suitably, the atomized droplets are allowed to fall under force of gravity of their own weight and under the influence of the expanding high-pressure spray gas into the fall chamber.

In another embodiment, the atomizer is located at the bottom of the fall chamber, i.e. the atomizer is spraying upwards. First, the atomized droplets fly upwards, while cooling air flows from the top to bottom. The velocity of the atomized droplets is slowed down until the droplets fall under force of gravity of their own weight. This fountain mode allows a smaller set up of the fall chamber.

Suitably, the atomized droplets are subsequently cooled in the atmosphere of the fall chamber. Upon cooling of the atomized droplets during falling from the top part to the bottom part of the fall chamber in a vertical direction, the atomized droplets solidify forming (solidified) compound particles.

Suitably, the fall chamber is optimally sized and shaped so as to accommodate the full spray of atomized droplets exiting from the atomizer. For example, the fall chamber is sized and shaped so as to allow for controlled cooling of the maximum spray area for the atomized droplets upon falling through the fall chamber.

The fall chamber may comprise substantially uniform conditions such as with respect to temperature and pressure or may comprise a plurality of processing zones.

For example, the fall chamber may comprise a series of heating or cooling zones independent from each other. For this purpose, the fall chamber may comprise one or more heating or cooling elements installed along the vertical axis of the fall chamber. In an embodiment, the atomized droplets are heated using radiation after atomization.

Generally, upon heating or cooling of the processing zones, the solidification of the atomized droplets may be influenced. For example, the solidification may be retarded upon increasing the temperature in one or more processing zones of the fall chamber during the falling of the atomized droplets.

In an embodiment, the liquefied dispersion is atomized into a stream of a cooling gas, wherein the cooling gas is at least partially heated.

Generally, the fall chamber may further comprise a tuned gas flow as required to control the temperature of the fall chamber as described above, and, more particularly, to control the passing of the atomized droplets through the fall chamber.

For this purpose, the fall chamber may comprise one or more gas inlets or high pressure blowers installed along the vertical axis of the fall chamber.

Generally, upon controlling the pressure of the processing zones, the speed of falling of the atomized droplets may be influenced. For example, the falling of the atomized droplets may be retarded in the event that a gas flow is introduced into a processing zone of the fall chamber which flows in direction from the bottom part to the top part of the fall chamber.

Suitably, the (solidified) compound particles may be separated based on any known criteria such as particle size, weight, sphericity, chemical makeup, or pursuant to other engineering design criteria. Said separation may occur via any known methodology, such as air classifiers, cyclones etc.

Suitably, the (solidified) compound particles are collected in a collecting chamber which is located below the atomizing nozzle. Preferably, the collecting chamber is located at the bottom part of the fall chamber and rests on the floor. Suitably, the collecting chamber comprises an outlet for the spray gas to exit and/or a hopper may be installed atop of the collecting chamber for directing the compound particles into the collecting chamber.

Compound particles that remain suspended in the exhaust air, in particular the fine fraction, may be separated from the gas stream by a cyclone and accumulate in a collecting chamber located below the cyclone. The chamber powder fraction and the cyclone powder fraction may be combined.

Alternatively, the entirety of the compound particles may be separated by a cyclone while still being suspended in the stream of air and collected.

After collecting the solidified compound particles in the collecting chamber, they may be subjected to further processing such as size classification by sieving, pneumatic size classification or hydraulic size classification, packaging, densification, and/or compaction.

The present invention is described in detail below with reference to the attached figures and examples.

List of Figures

Figure 1:
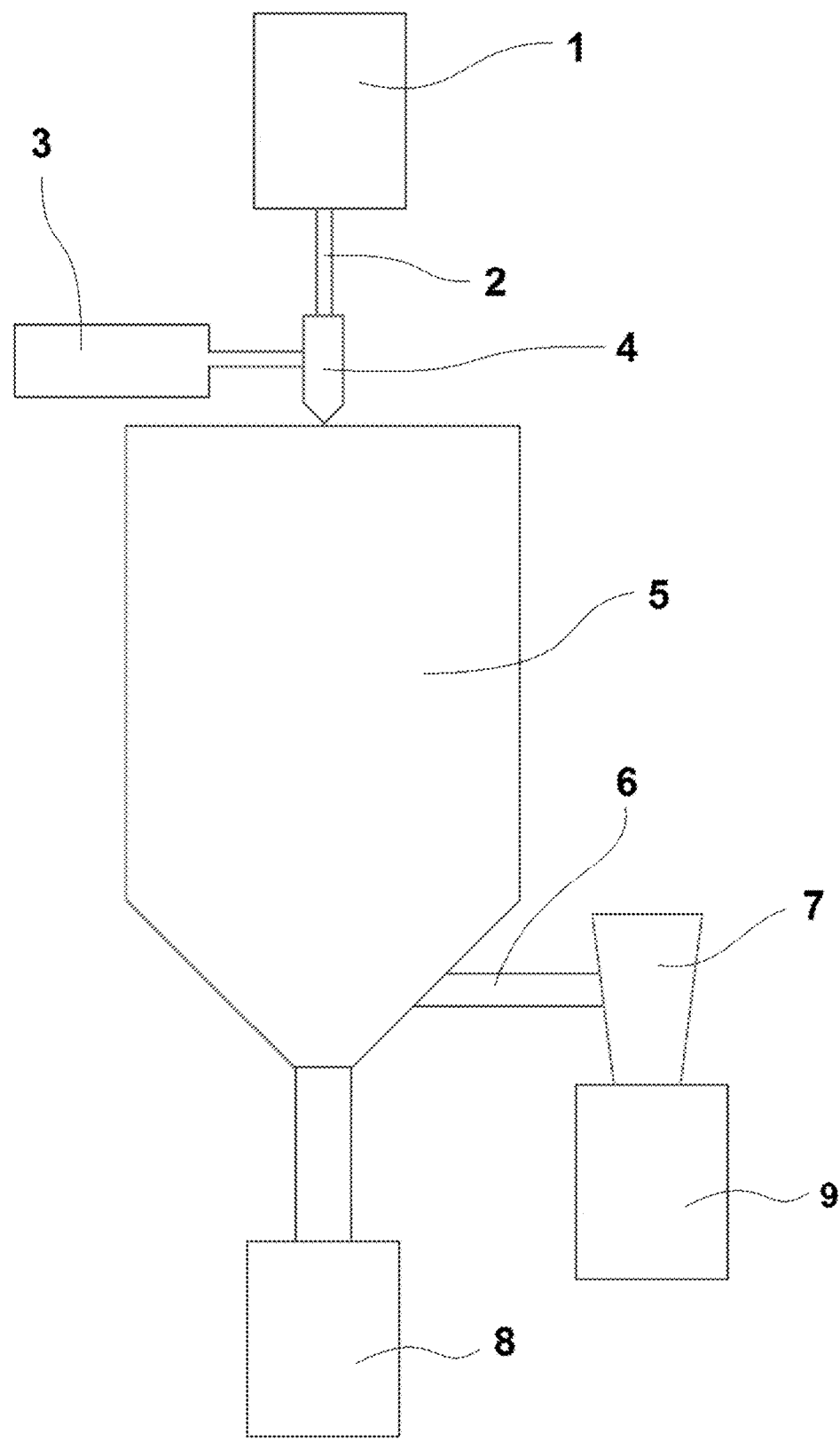
FIG. 1 depicts a plant for performing a process for preparing compound particles by atomization of a liquefied dispersion of pulverulent non-organic particles dispersed in a liquefied temporary organic binder.

FIG. 1 shows a plant for carrying out the inventive process. A feedstock composition is contained in melting vessel 1 and is heated to obtain a melt. The melt is pressurized and pumped via heated melt pipe 2 to the two-fluid nozzle 4 In the continuous flow heater 3, air is heated to obtain heated spray air. The heated spray air is directed to the two-fluid nozzle 4. At the two-fluid nozzle 4, the melt is atomized via the heated spray air to obtain atomized droplets. Said atomized droplets solidify during their passage through the fall chamber 5. The fine fraction is separated using a cyclone 7 to obtain the compound particles. Said compound particles are stored in the collecting chamber 8.

EXAMPLES

REM/EDX images were obtained on a Phenom Pro Desktop G3 SEM device, available from Thermo Fisher Scientific Inc. (USA).

CT images were obtained on a Phoenix Nanotom® M CT device, available from GE Inspection Technologies (Wunstorf). For the acquisition of the images, the compound particles were filled into a hollow cylinder.

Example 1

A feedstock composition as shown in table 1 was used for the preparation of compound particles using a plant according to FIG. 1.

TABLE 1

Feedstock composition.

| | component | amount [vol.-%] | amount [vol.-%] |
|---|---|---|---|
| pulverulent non-organic particles (i) | stainless steel 316 L [1] | — | 62 |
| binder (ii) compound 1 | Griltex 2439 A [2] | 27 | 38 |
| binder (ii) compound 2 | Loxiol 2472 [3] | 69 | |
| binder (ii) compound 3 | Loxiol G20 [4] | 4 | |

[1] Gas atomized, particle size 90%: 22 μm, available from Sandvik Osprey Ltd
[2] Copolyamide available from EMS-CHEMIE HOLDING AG
[3] Mixture of carboxylic acid esters available from Emery Oleochemicals GmbH
[4] Stearic acid available from Emery Oleochemicals GmbH The feedstock according to table 1 was transferred into melting vessel 1 and heated to 160° C. to obtain a melt. Afterwards, the melt was pressurized to 5.5 bara and pumped via heated melt pipe 2 to the two-fluid nozzle 4 ("Modell 970 Form 0", available from Düsen-Schlick GmbH). The two-fluid nozzle 4 had a nozzle diameter of 1 mm and the nozzle valve was set to position 3. Air was heated using a continuous flow heater 3 obtaining heated spray air having a temperature of 270° C. at the continuous flow heater 3. The heated spray air was transported to the two-fluid nozzle 4 and had a temperature of 196° C. at the two-fluid nozzle 4. At the two-fluid nozzle 4, the melt was atomized via the heated spray air at a spray air pressure of 3 bara and a spray air flow rate of 2.42 m³/h to obtain atomized droplets. After solidification, a first fraction of solidified atomized droplets was collected in a collecting chamber 8 at the bottom of the spray tower. The fine fraction was sucked off from fall chamber 5 together with the exhaust air at an exhaust air flow rate of 250 m³/h and separated using a cyclone 7 to obtain the fine fraction of the compound particles. Said compound particles were collected in the collecting chamber 9. Compound particles from collecting chambers 8 and 9 were blended.

Figure 2:
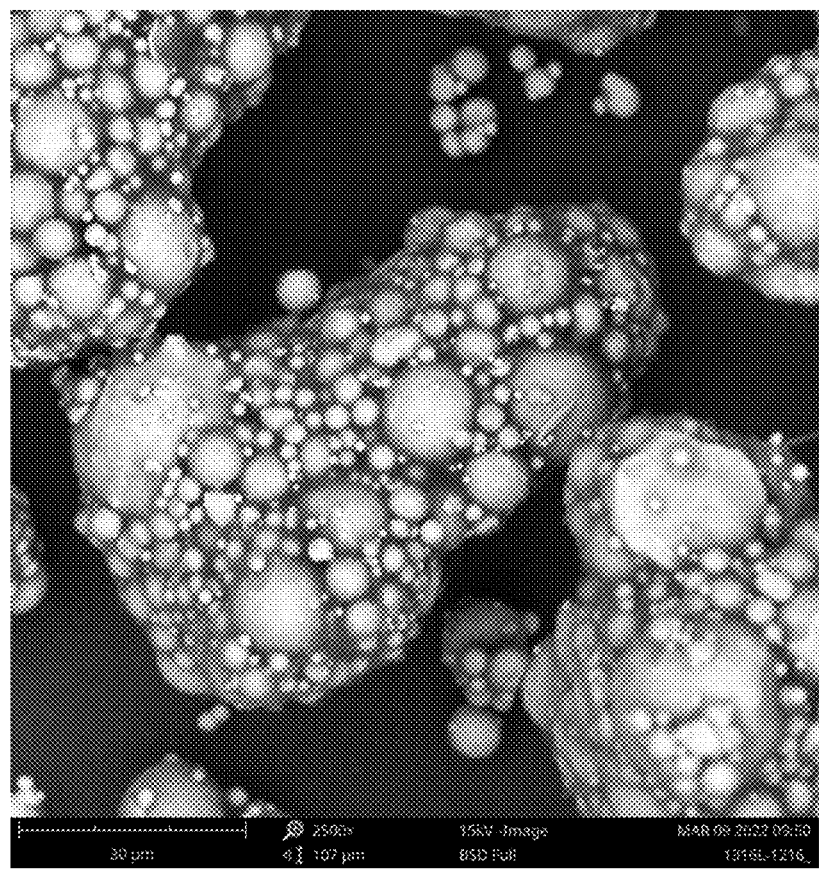
FIG. 2 depicts REM/EDX images of compound particles produced with a two-fluid-nozzle.

REM/EDX images of the obtained compound particles are shown in FIG. 2. It can be seen from FIG. 2 that the compound particles have essentially smooth surfaces with exposed pulverulent non-organic particles which are joined with the temporary organic binder. Evidently, the temporary organic binder presents non-fractured surfaces. The majority of the compound particles has a potato-like shape.

Figure 3:
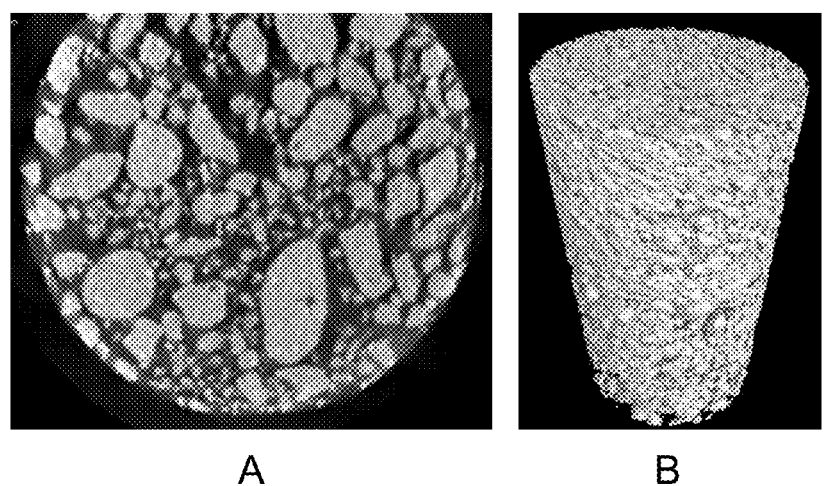
FIG. 3 depicts CT images of compound particles produced with a two-fluid-nozzle.

CT images of the obtained compound particles are shown in FIG. 3. FIG. 3A shows a cross-section perpendicular to the longitudinal direction of the cylindrical holder. FIG. 3B shows a view of the compound particles in the cylindrical holder. It can be seen from FIG. 3 that pores are essentially absent in the compound particles.

The compound particles as prepared by atomization of the feedstock according to table 1 as described above were investigated regarding particle size and sphericity as produced without sieving. The particle size determination experiments were performed using a Camsizer X2 device (available from Retsch Technology GmbH; Haan; Germany). The results are shown in table 2.

TABLE 2

Particle size values and sphericity of the compound particles.

| Range of particle size [μm] | | p3 [1] [%] | Q3 [2] [%] | SPHT3 [3] |
|---|---|---|---|---|
| >0 | 10 | 3.1 | 0.31 | 0.898 |
| >10 | 20 | 10.7 | 0.76 | 0.904 |
| >20 | 30 | 18.4 | 0.77 | 0.898 |
| >30 | 40 | 25.2 | 0.68 | 0.897 |
| >40 | 50 | 31.6 | 0.64 | 0.897 |
| >50 | 60 | 36.3 | 0.47 | 0.904 |
| >60 | 70 | 40.9 | 0.46 | 0.883 |
| >70 | 80 | 45 | 0.41 | 0.882 |
| >80 | 90 | 48.6 | 0.36 | 0.879 |
| >90 | 100 | 52.5 | 0.39 | 0.88 |
| >100 | 110 | 56.1 | 0.36 | 0.862 |
| >110 | 120 | 59.6 | 0.35 | 0.859 |
| >120 | 130 | 62.7 | 0.31 | 0.854 |
| >130 | 140 | 65.7 | 0.3 | 0.849 |
| >140 | 150 | 68.4 | 0.27 | 0.845 |
| >150 | 160 | 70.9 | 0.25 | 0.84 |
| >160 | 170 | 73.2 | 0.23 | 0.836 |
| >170 | 180 | 75.3 | 0.21 | 0.832 |
| >180 | 190 | 77.2 | 0.19 | 0.828 |
| >190 | 200 | 79 | 0.18 | 0.826 |
| >200 | 210 | 80.7 | 0.17 | 0.824 |
| >210 | 220 | 82.4 | 0.17 | 0.826 |
| >220 | 230 | 83.9 | 0.15 | 0.822 |
| >230 | 240 | 85.2 | 0.13 | 0.815 |
| >240 | 250 | 86.6 | 0.14 | 0.821 |
| >250 | | 100 | 0 | 0.798 |

[1] Fraction
[2] Cumulative distribution
[3] Sphericity

The following particle size distribution values were determined: Dv(50)=94.1 μm, Dv(90)=282.2 μm. The mean value of the sphericity of the compound particles was determined to be 0.783.

The compound particles as prepared by atomization of the feedstock according to table 1 as described above were investigated regarding their true density and apparent density.

The apparent density values were determined using a Ultrapyc 5000 helium pycnometer device (available from Anton Paar Group AG). A 135 cm³ measurement cell was used and the device was calibrated prior to use by determination of the volume of the measurement cell using standardized NIST certified calibration spheres. For determination of the apparent density of the compound particles, the measurement cell was filled with a certain amount of compound particles followed by an automated measurement protocol of 25 measurement runs by the pycnometer device. The determined apparent density is 5.60 g/cm³.

The calculated theoretical density is 5.23 g/cm³.

Thus, the apparent density of the compound particles was calculated to be 5.60:5.23=107.05% of true density.

The compound particles which were produced as described above were used as starting material to produce cylindrical testing specimens and showcase parts (compressor wheels) via a laser additive manufacturing process. Said laser additive manufacturing process was performed using a Formiga P110 (available from EOS GmbH). The laser output was 25 W at a laser speed of 4450 mm/s and a hatch spacing of 0.13 mm resulting in an energy input of 42.3 mJ/mm². The resulting green parts (cylindrical testing specimens and compressor wheels) were debound using a EDA 30 debinding machine (available from Lömi GmbH). For debinding, the green part was positioned inside the debinding chamber of the debinding machine, wherein said debinding chamber was filled with acetone. Then, the solvent was heated to 40° C. at a heating rate of 5 K/h and the temperature was held constant for 8 h. Afterwards, the solvent was cooled to room temperature at a cooling rate of 5 K/h. The resulting (debound) brown parts were sintered using an ISO 140-140 1550 Mo sintering furnace (available from MUT Advanced Heating GmbH) at a temperature of 1380° C. for 3 h obtaining the sintered part.

Figure 4:
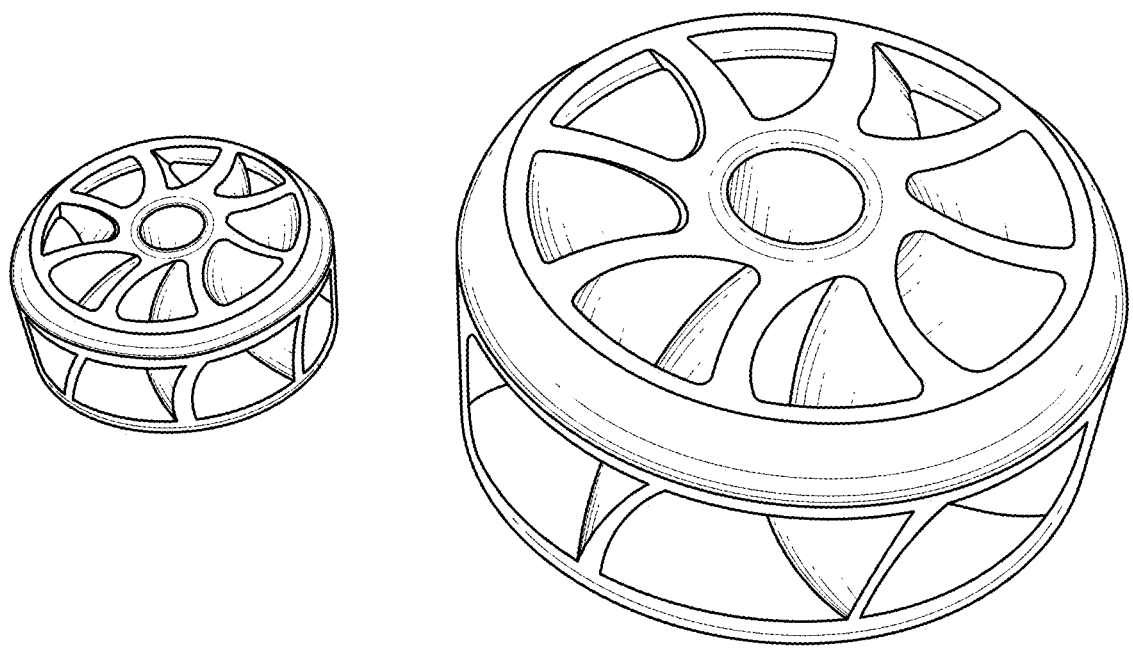
FIG. 4 depicts a small and a large compressor wheel which were manufactured from the compound particles by a laser additive manufacturing process.

The resulting small and large compressor wheels are depicted in FIG. 4. Two cylindrical testing specimens were produced which are not shown in the figures.

The resulting two cylindrical testing specimens and two compressor wheels were investigated for their densities. The determined density values are shown in table 3.

TABLE 3

Density values of sintered parts.

| part | density [%] |
|---|---|
| cylindrical testing specimen 1 | 98.1 |
| cylindrical testing specimen 2 | 98.0 |
| small compressor wheel | 98.0 |
| large compressor wheel | 98.0 |

Figure 5:
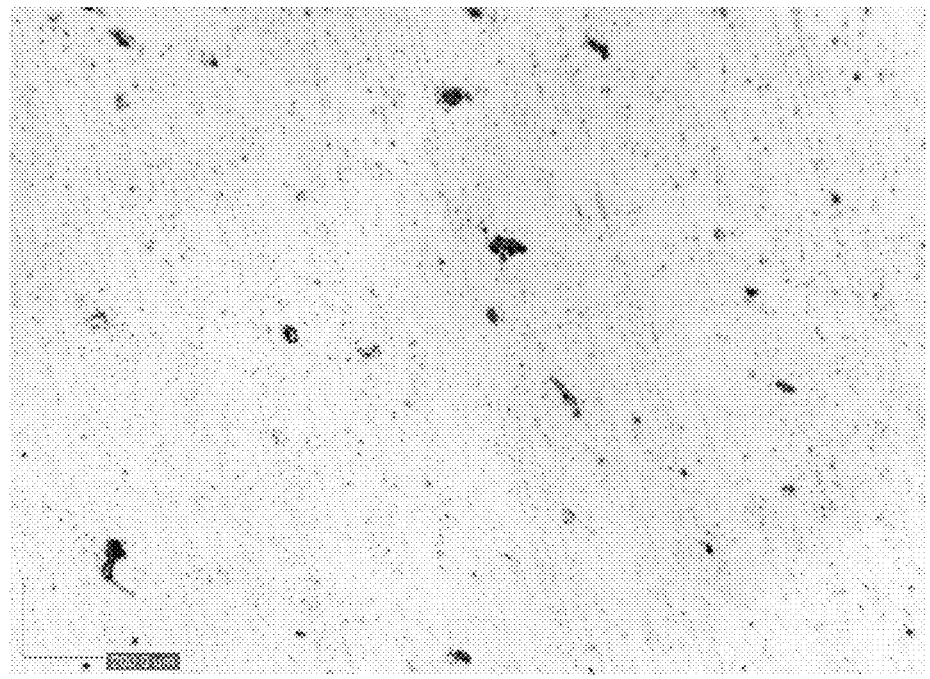
FIG. 5 depicts an image of a section of the surface of a cylindrical testing specimen which was manufactured from the compound particles by a laser additive manufacturing process.
Figure 6:
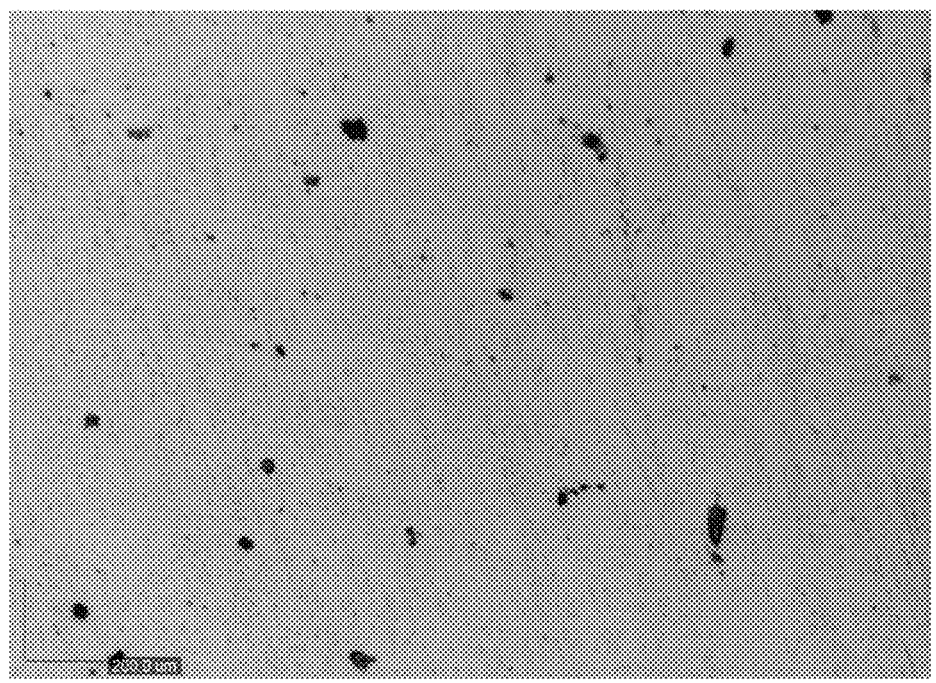
FIG. 6 depicts an image of a section of the surface of a cylindrical testing specimen which was manufactured from the compound particles by a laser additive manufacturing process.

Images of a section of the surface of each cylindrical testing specimen 1 and 2 are depicted in FIGS. 5 and 6, which were prepared on a manual grinding and polishing machine LaboPol 21 from Struers ApS (Denmark). It can be seen from FIGS. 5 and 6 that high densities are achieved after sintering.

Example 2

A feedstock composition as shown in table 4 was used for the preparation of compound particles.

TABLE 4

Feedstock composition.

| | component | amount [vol.-%] | amount [vol.-%] |
|---|---|---|---|
| pulverulent non-organic particles (i) | stainless steel 316 L [1] | — | 65 |
| binder (ii) compound 1 | Deurex E06K [2] | 27 | 35 |
| binder (ii) compound 2 | Deurex A27P [3] | 73 | |

[1] Gas atomized, particle size 90%: 22 μm, available from Sandvik Osprey Ltd
[2] Polyethylene wax available from Deurex AG
[3] Polyamide wax available from Deurex AG The feedstock according to table 4 was transferred into melting vessel 1 and heated to 120° C. to obtain a melt. Afterwards, the melt was pressurized to 4 bara and pumped via heated melt pipe 2 to the two-fluid nozzle 4 ("Modell 970 Form 0", available from Düsen-Schlick GmbH). The two-fluid nozzle 4 had a nozzle diameter of 0.5 mm and the nozzle valve was set to position 3. Air was heated using a continuous flow heater 3 obtaining heated spray air having a temperature of 180° C. at the continuous flow heater 3. The heated spray air was transported to the two-fluid nozzle 4 and had a temperature of 135° C. at the two-fluid nozzle 4. At the two-fluid nozzle 4, the melt was atomized via the heated spray air at a spray air pressure of 1.4 bara and a spray air flow rate of 1.36 m³/h to obtain atomized droplets. After solidification, solidified atomized droplets were collected in a collecting chamber 8 at the bottom of the spray tower. The fine fraction was sucked off from fall chamber 5 together with the exhaust air at an exhaust air flow rate of 250 m³/h and separated using a cyclone 7 to obtain the fine fraction of the compound particles. The fine fraction was discharged.

Figure 7:
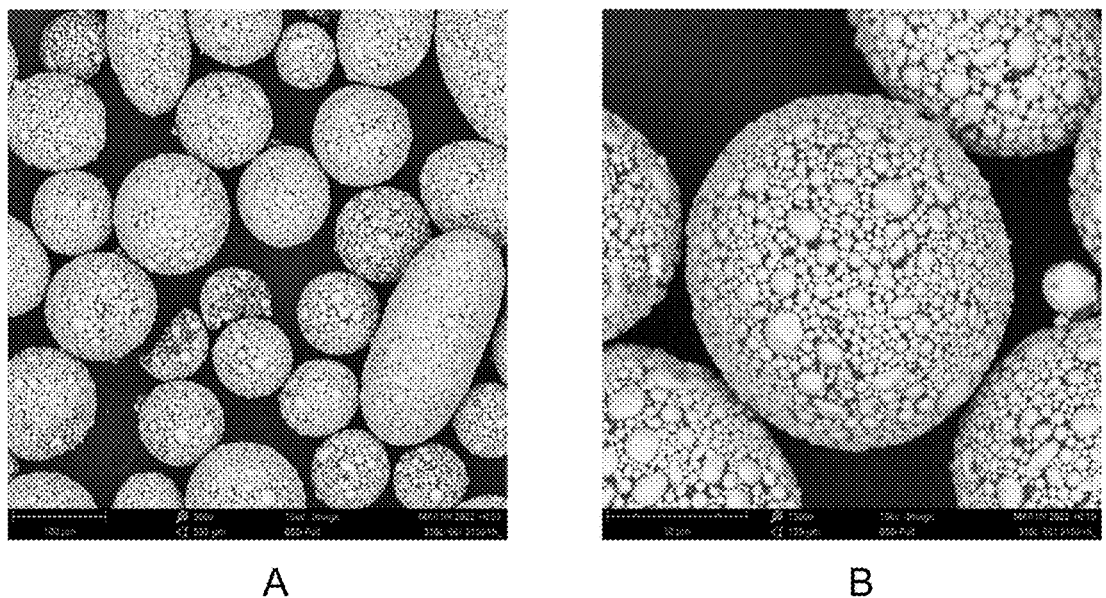
FIG. 7 depicts REM/EDX images of compound particles produced with a two-fluid-nozzle.

REM/EDX images of the obtained compound particles are shown in FIG. 7. It can be seen from FIG. 7 that the compound particles have essentially smooth surfaces with exposed pulverulent non-organic particles which are joined with the temporary organic binder. Evidently, the temporary organic binder presents non-fractured surfaces. The majority of the compound particles has a nearly spherical shape.

Figure 8:
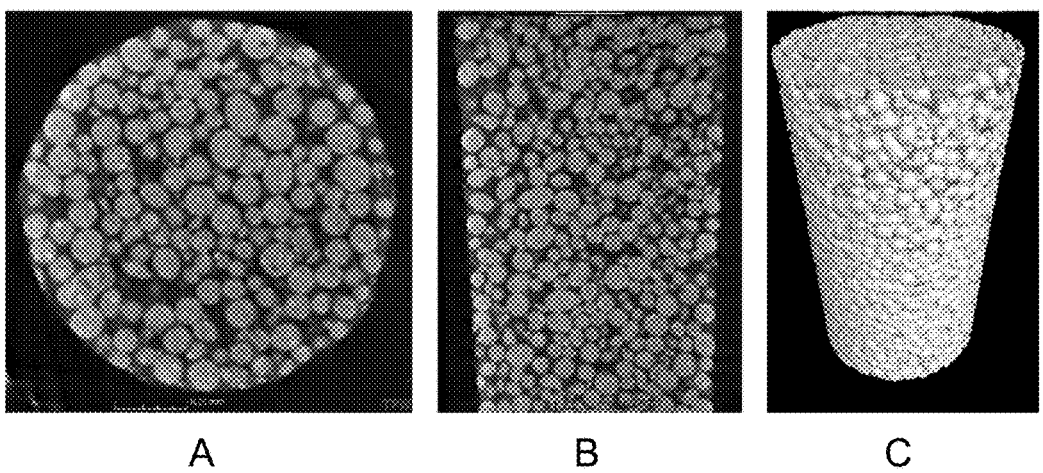
FIG. 8 depicts CT images of compound particles produced with a two-fluid-nozzle.

CT images of the obtained compound particles are shown in FIG. 8. FIG. 8A shows a cross-section perpendicular to the longitudinal direction of the cylindrical holder. FIG. 8B shows a cross-section in the longitudinal direction. FIG. 3c shows a view of the compound particles in the cylindrical holder. It can be seen from FIG. 8 that pores are essentially absent in the compound particles.

The compound particles as prepared by atomization of the feedstock according to table 4 as described above were investigated regarding particle size and sphericity as produced without sieving. The particle size determination experiments were performed using a Camsizer X2 device (available from Retsch Technology GmbH; Haan; Germany). The results are shown in table 5.

TABLE 5

Particle size values and sphericity of the compound particles.

| Range of particle size [μm] | | p3 [1] [%] | Q3 [2] [%] | SPHT3 [3] |
|---|---|---|---|---|
| >0 | 10 | 0.3 | 0.3 | 0.899 |
| >10 | 20 | 3.2 | 3.5 | 0.911 |
| >20 | 30 | 4.8 | 8.3 | 0.896 |
| >30 | 40 | 3.5 | 11.8 | 0.896 |
| >40 | 50 | 2.8 | 14.6 | 0.868 |
| >50 | 60 | 3.1 | 17.7 | 0.87 |
| >60 | 70 | 3.8 | 21.5 | 0.894 |
| >70 | 80 | 4.3 | 25.8 | 0.927 |
| >80 | 90 | 4.7 | 30.5 | 0.922 |
| >90 | 100 | 4.1 | 34.6 | 0.904 |
| >100 | 110 | 5.1 | 39.7 | 0.942 |
| >110 | 120 | 5.1 | 44.8 | 0.935 |
| >120 | 130 | 4.9 | 49.7 | 0.926 |
| >130 | 140 | 4.6 | 54.3 | 0.919 |
| >140 | 150 | 4.5 | 58.8 | 0.911 |
| >150 | 160 | 4 | 62.8 | 0.903 |
| >160 | 170 | 3.9 | 66.7 | 0.894 |
| >170 | 180 | 3.5 | 70.2 | 0.89 |
| >180 | 190 | 3.1 | 73.3 | 0.882 |
| >190 | 200 | 3.1 | 76.4 | 0.878 |
| >200 | 210 | 2.8 | 79.2 | 0.867 |
| >210 | 220 | 2.6 | 81.8 | 0.86 |
| >220 | 230 | 2.5 | 84.3 | 0.86 |
| >230 | 240 | 2.1 | 86.4 | 0.853 |
| >240 | 250 | 2.1 | 88.5 | 0.84 |
| >250 | | 11.5 | 100 | 0.788 |

[1] Fraction
[2] Cumulative distribution
[3] Sphericity

The following particle size distribution values were determined: Dv(50)=130.6 μm, Dv(90)=257.9 μm. The mean value of the sphericity of the compound particles was determined to be 0.887.

The compound particles as prepared by atomization of the feedstock according to table 4 as described above were investigated regarding their theoretical density and apparent density.

The apparent density values were determined using a Ultrapyc 5000 pycnometer device (available from Anton Paar Group AG) as described above. The determined apparent density is 5.36 g/cm³.

The calculated theoretical density is 5.23 g/cm³.

Thus, the apparent density of the compound particles was calculated to be 5.36:5.23=102.54% of theoretical density.

The compound particles which were produced as described above were used as starting material to produce cylindrical testing specimens via a laser additive manufacturing process. Said laser additive manufacturing process was performed as described above. Two cylindrical testing specimens were produced which are not shown in the figures.

The resulting two cylindrical testing specimens were investigated for their densities. The determined density values are shown in table 6.

TABLE 6

Density values of sintered parts.

| part | density [%] |
|---|---|
| cylindrical testing specimen 1 | 98.1 |
| cylindrical testing specimen 2 | 98.0 |

Example 3

A feedstock composition as shown in table 1 above was used for the preparation of compound particles using a plant according to FIG. 1. Said feedstock was transferred into melting vessel 1 and heated to 160° C. to obtain a melt. Afterwards, the melt was pressurized to 5.5 bara and pumped via heated melt pipe 2 to a custom-built rotary atomizer. The rotary atomizer had a rotary disc with a diameter of 28 mm and was heated with heated pressurized air of 200° C. The melt was transported to the middle of the disk and was atomized via the rotary disc at a speed of 20.000 rpm to obtain atomized droplets.

After solidification, a first fraction of solidified atomized droplets was collected in a collecting chamber 8 at the bottom of the spray tower. The fine fraction was sucked off from fall chamber 5 together with the exhaust air at an exhaust air flow rate of 250 m³/h and separated using a cyclone 7 to obtain the fine fraction of the compound particles. Said compound particles were collected in the collecting chamber 9. Compound particles from collecting chambers 8 and 9 were blended.

Figure 9:
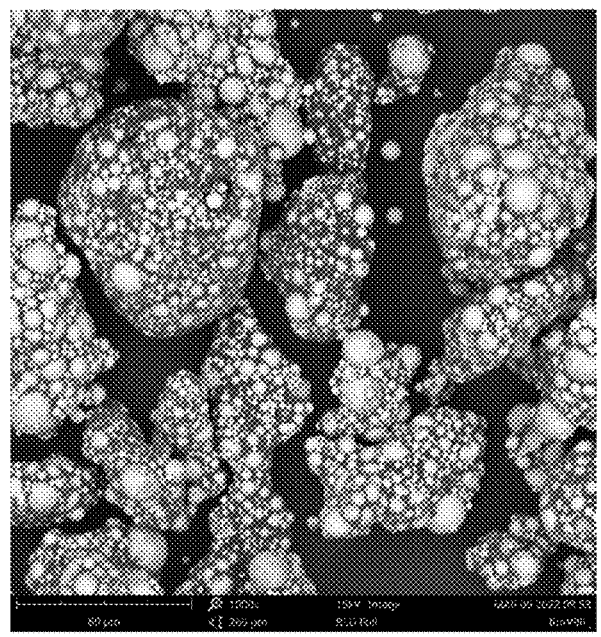
FIG. 9 depicts REM/EDX images of compound particles produced with a rotary atomizer.

REM/EDX images of the obtained compound particles are shown in FIG. 9. It can be seen from FIG. 9 that the compound particles have essentially smooth surfaces with exposed pulverulent non-organic particles which are joined with the temporary organic binder. Evidently, the temporary organic binder presents non-fractured surfaces. The majority of the compound particles has a nearly spherical shape.

The compound particles as prepared by atomization of the feedstock according to table 1 as described above were investigated regarding particle size and sphericity as produced without sieving. The particle size determination experiments were performed using a Camsizer X2 device (available from Retsch Technology GmbH; Haan; Germany). The results are shown in table 7.

TABLE 7

Particle size values and sphericity of the compound particles.

| Range of particle size [μm] | | p3 [1] [%] | Q3 [2] [%] | SPHT3 [3] |
|---|---|---|---|---|
| >0 | 10 | 0.8 | 0.8 | 0.883 |
| >10 | 20 | 2.7 | 3.5 | 0.889 |
| >20 | 30 | 5.6 | 9.1 | 0.858 |
| >30 | 40 | 10.1 | 19.2 | 0.819 |
| >40 | 50 | 12.1 | 31.3 | 0.795 |
| >50 | 60 | 14.3 | 45.6 | 0.775 |
| >60 | 70 | 14.4 | 60.0 | 0.755 |
| >70 | 80 | 12.7 | 72.7 | 0.814 |
| >80 | 90 | 9.9 | 82.6 | 0.804 |
| >90 | 100 | 6.7 | 89.3 | 0.785 |
| >100 | 110 | 4.7 | 94.0 | 0.822 |
| >110 | 120 | 2.8 | 96.8 | 0.807 |
| >120 | 130 | 1.5 | 98.3 | 0.792 |
| >130 | 140 | 0.8 | 99.1 | 0.779 |
| >140 | 150 | 0.4 | 99.5 | 0.766 |
| >150 | 160 | 0.2 | 99.7 | 0.775 |
| >160 | 170 | 0.2 | 99.9 | 0.755 |
| >170 | 180 | 0.0 | 99.9 | 0.771 |
| >180 | 190 | 0.1 | 100.0 | 0.777 |
| >190 | 200 | 0.0 | 100.0 | 0.801 |
| >200 | 210 | 0.0 | 100.0 | — |
| >210 | 220 | 0.0 | 100.0 | — |
| >220 | 230 | 0.0 | 100.0 | — |
| >230 | 240 | 0.0 | 100.0 | — |
| >240 | 250 | 0.0 | 100.0 | — |
| >250 | | 0.0 | 100.0 | — |

[1] Fraction
[2] Cumulative distribution
[3] Sphericity

The following particle size distribution values were determined: Dv(50)=62.8 μm, Dv(90)=101.2 μm. The mean value of the sphericity of the compound particles was determined to be 0.799.

The compound particles as prepared by atomization of the feedstock according to table 1 as described above were investigated regarding their theoretical density and apparent density.

The apparent density values were determined using a Ultrapyc 5000 pycnometer device (available from Anton Paar Group AG) as described above. The determined apparent density is 5.50 g/cm³.

The calculated theoretical density is 5.23 g/cm³.

Thus, the apparent density of the compound particles was calculated to be 5.50:5.23=105.16% of theoretical density.

The compound particles which were produced as described above were used as starting material to produce cylindrical testing specimens via a laser additive manufacturing process. Said laser additive manufacturing process was performed as described above. Two cylindrical testing specimens were produced which are not shown in the figures.

The resulting two cylindrical testing specimens were investigated for their densities. The determined density values are shown in table 8.

TABLE 8

Density values of sintered parts.

| part | density [%] |
|---|---|
| cylindrical testing specimen 1 | 98.1 |
| cylindrical testing specimen 2 | 98.3 |

Comparative Example

A feedstock composition according to table 1 was molten and solidified to a block.

Figure 10:
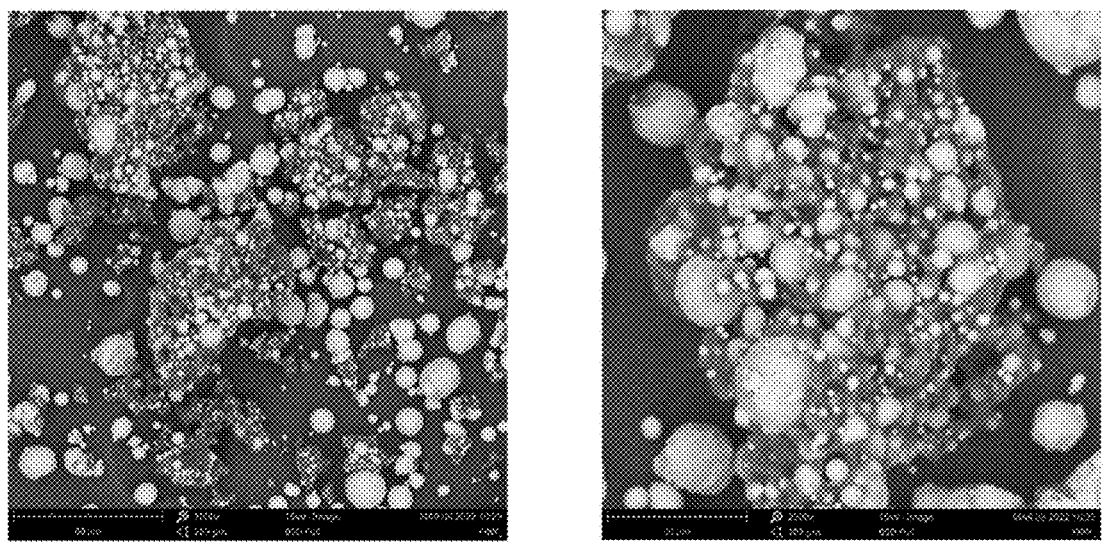
FIG. 10 depicts REM/EDX images of compound particles produced with a hammer mill.

Subsequently, the block was comminuted using hammer mill EasyMill-Lab HM-1 (available from Frewitt). The results are depicted in FIG. 10. It can be seen from FIG. 10 that the compound particles exhibit a sponge-like structure with fractured and angular surfaces as well as a lot of fine fraction and primary metal particles.

LIST OF REFERENCE SIGNS

1 heated melting vessel
2 heated melt pipe
3 continuous flow heater
4 two-fluid nozzle
5 fall chamber
6 pipe
7 cyclone
8 collecting chamber
9 collecting chamber

The invention claimed is:

1. A plurality of compound particles for use in a shaping and sintering process, comprising pulverulent non-organic particles in a temporary organic binder, wherein:
   (i) the pulverulent non-organic particles are selected from metals, alloys, vitreous particles and ceramic particles, and at least 80% of the pulverulent non-organic particles have a maximum dimension $A_{max}$ in the range of from 10 nm to 500 µm,
   (ii) the amount of the pulverulent non-organic particles ranges from about 30 to 75 vol.-%, and the temporary organic binder ranges from about 25 to 70 vol.-%, based on the total volume of the compound particles,
   (iii) at least 80% of the compound particles have a maximum dimension $B_{max}$ in the range of from 10 µm to 1000 µm, and
   (iv) the compound particles have an apparent density of at least 70% of the true density, and
   (v) the compound particles have continuous external surfaces formed from pulverulent non-organic particles exposed at the external surfaces and temporary organic binder in the interstices between the pulverulent non-organic particles, the temporary organic binder presenting non-fractured surfaces.

2. The plurality of compound particles of claim 1, wherein the temporary organic binder essentially completely fills the void spaces between the non-organic particles in the compound particle and forms menisci at the external compound particles surfaces.

3. The plurality of compound particles of claim 1, wherein the compound particles essentially have a non-angular shape.

4. The plurality of compound particles of claim 1, wherein the compound particles have an apparent density of at least 75% of the true density.

5. The plurality of compound particles of claim 1, wherein the compound particles do not have an interconnected porosity.

6. The plurality of compound particles of claim 1, wherein the compound particles have a spherical shape, a drop-shape, a potato-shape, a sausage-shape, a fibrous shape, a whisker-shape, or combinations thereof.

7. The plurality of compound particles of claim 1, wherein at least 85% of the compound particles have a maximum dimension $B_{max}$ in the range of from 5 µm to 700 µm.

8. The plurality of compound particles of claim 1, wherein the temporary organic binder comprises a first thermoplastic and/or wax-type material (b-i) and the second thermoplastic and/or wax-type material (b-ii) which differ in at least one property which property is selected from solubility in a solvent, degradability induced by heat and/or a reactant, and volatility.

9. The plurality of compound particles of claim 1, wherein the compound particles exhibit a ratio of the BET surface area to the projected surface area of 20 or less.

10. The plurality of compound particles of claim 1, wherein the compound particles have an apparent density of at least 80% of the true density.

11. The plurality of compound particles of claim 1, wherein the compound particles have an apparent density of at least 85% of the true density.

12. The plurality of compound particles of claim 1, wherein the compound particles have an apparent density of at least 90% of the true density.

13. The plurality of compound particles of claim 1, wherein the compound particles have an apparent density of at least 95% of the true density.

14. The plurality of compound particles of claim 1, wherein the compound particles have an apparent density of at least 99% of the true density.

15. The plurality of compound particles of claim 1, wherein at least 90% of the compound particles have a maximum dimension $B_{max}$ in the range of from 10 µm to 500 µm.

16. The plurality of compound particles of claim 1, wherein at least 95% of the compound particles have a maximum dimension $B_{max}$ in the range of from 15 µm to 300 µm.

17. The plurality of compound particles of claim 1, wherein at least 99% of the compound particles have a maximum dimension $B_{max}$ in the range of from 30 µm to 200 µm.

18. The plurality of compound particles of claim 1, wherein the compound particles exhibit a ratio of the BET surface area to the projected surface area of 15 or less.

19. The plurality of compound particles of claim 1, wherein the compound particles exhibit a ratio of the BET surface area to the projected surface area of 10 or less.

20. The plurality of compound particles of claim 1, wherein the compound particles exhibit a ratio of the BET surface area to the projected surface area of 5 or less.

* * * * *